United States Patent
Chen et al.

(10) Patent No.: US 7,619,074 B2
(45) Date of Patent: Nov. 17, 2009

(54) REACTIVE DYESTUFF WITH N,N-DIALKYLAMINO BRIDGE GROUP

(75) Inventors: Wen-Jang Chen, Jhongli (TW); Ya-Cing Yu, Taichung (TW); Hong-Chang Huang, Taipei (TW); Chien-Yu Chen, Lujhu Township, Taoyuan County (TW); Chen-Lung Kao, Dayuan Township, Taoyuan County (TW); Hsien-Chung Hsia, Jhongli (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 12/153,473

(22) Filed: May 20, 2008

(65) Prior Publication Data

US 2009/0176972 A1    Jul. 9, 2009

(30) Foreign Application Priority Data

Jan. 8, 2008    (CN)    .................... 2008 1 0002300

(51) Int. Cl.
C09B 62/513    (2006.01)
C09B 62/515    (2006.01)
C09B 35/029    (2006.01)

(52) U.S. Cl. .................. 534/629; 534/642; 534/643; 534/835; 562/67; 564/341

(58) Field of Classification Search .................. None
See application file for complete search history.

(56) References Cited

U.S. PATENT DOCUMENTS 3,912,712 A * 10/1975 Peter et al. ............... 534/614
3,915,952 A * 10/1975 Sailer et al. .............. 534/687
5,735,941 A * 4/1998 Feeman et al. ........... 106/31.28
5,998,590 A * 12/1999 Feeman et al. ........... 534/603
6,130,319 A * 10/2000 Feeman et al. ........... 534/604

OTHER PUBLICATIONS

Google search results for "qualter salt", Dec. 18, 2008.*

* cited by examiner

Primary Examiner—Fiona T Powers
(74) Attorney, Agent, or Firm—Bacon & Thomas, PLLC

(57) ABSTRACT

The present invention relates to a novel reactive dyestuff with an N,N-dialkylamino bridge group, represented by the following formula (I):

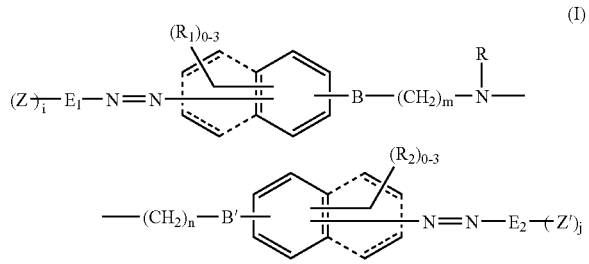

wherein R, B, B', $E_1$, $E_2$, Z, Z', i, j, $R_1$, $R_2$, m and n are defined the same as the specification. The reactive dyestuff of the present invention is suitable for exhaust dyeing, cold batch-up dyeing, continuous dyeing, printing and digital spray printing materials that contain hydroxyl group or polyamine fibers.

21 Claims, No Drawings

REACTIVE DYESTUFF WITH N,N-DIALKYLAMINO BRIDGE GROUP

BACKGROUND OF THE INVENTION

1. Field of the Invention

The present invention relates to a novel reactive dyestuff with an N,N-dialkylamino bridge group and, more particularly, to a novel reactive dyestuff that is suitable for exhaust dyeing, cold batch-up dyeing, continuous dyeing, printing and digital spray printing materials that contain hydroxyl group or polyamine fibers.

2. Description of Related Art

An azo dyestuff, where the chromophore thereof is composed of diazo components and coupling components, can be widely employed and used as a reactive dyestuff for heavy color dyeing, such as red, navy blue, black and so on, owing to its board color gamut and high extinction coefficient. Among azo dyestuffs, a navy blue reactive dyestuff with sulphato-ethyl-sulphone (SES) groups produced in 1957 by Hoechst in Germany, C.I. Reactive Black 5, is the most well-known. C.I. Reactive Black 5 can be used to dye fabrics intensely heavy shade and its structure is represented by the following formula (A).

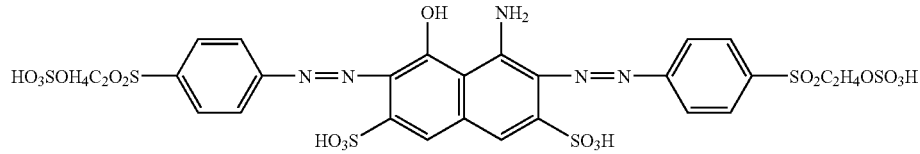

(A)

The reactive dyestuff has bee applied in the dyestuff industry for many years. Currently, the development of reactive dyestuffs moves towards higher fixation and better build up to meet the economic demands. Over the years, many researches focus on the development of dyestuffs that show better build up to meet the economic demands in comparison to C.I. Reactive Black 5. For example, in 1980, Hoyer et al. in Hoechst disclosed a tetraazo structure with a sulfonyl bridge group in U.S. Pat. No. 4,244,258. The tetraazo structure is represented by the following formula (B).

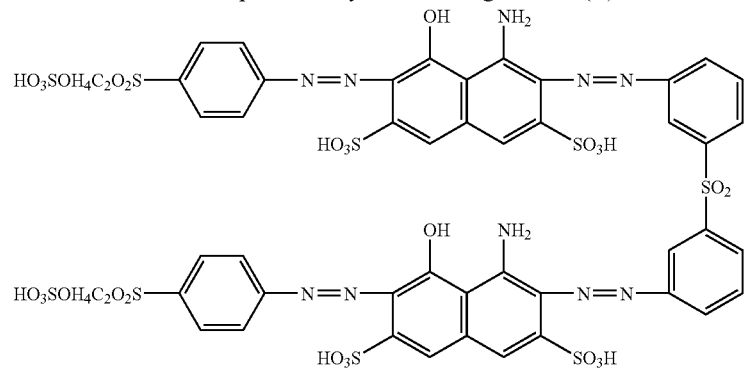

(B)

In 1997, Tzikas et al. in CIBA Geigy disclosed a tetraazo structure with an aminocarbonyl or aminosulfonyl bridge group in U.S. Pat. No. 5,629,410. The tetraazo structure is represented by the following formula (C).

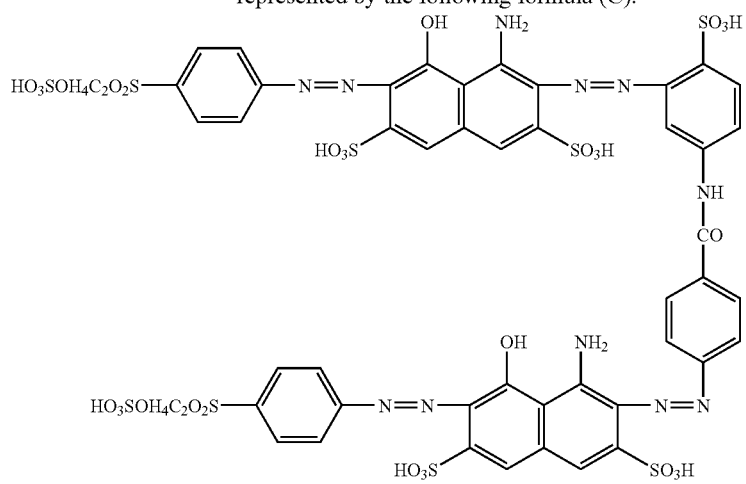

(C)

However, the build up, hue-shift, levelness and wash fastness of the aforementioned novel dyestuffs cannot meet the market requirements. Thereby, it is desirable to improve the aforementioned properties.

SUMMARY OF THE INVENTION

By various experiments, the present inventors discovered that a novel compound with an N,N-dialkylamino bridge group, as shown in the following formula (D), and the method for manufacturing the same can be applied in the reactive dyestuff field to obtain a series of yellow, orange, red, navy blue, black reactive dyestuffs, which can show high color yield, high fixation, improved fastness and stable bonding between the fibers and the dyestuffs.

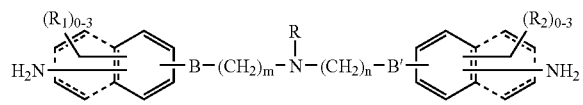

(D)

Accordingly, the present invention provides a novel reactive dyestuff with an N,N-dialkylamino bridge group, which exhibits the properties of improved fixation yield, excellent build up, high wash fastness and excellent wet fastness while dyeing cellulose fibers.

A novel reactive dyestuff with an N,N-dialkylamino bridge group according to the present invention is represented by the following formula (I),

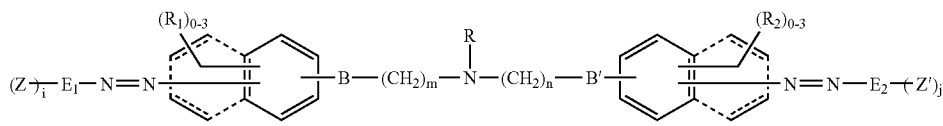

(I)

wherein, $E_1$ and $E_2$ each independently are couplers selected from the group consisting of benzene, naphthalene, pyrazolone, monoazo, disazo, polyazo and metal complex azo components;

R is hydrogen, $C_{1-4}$ alkyl, $C_{1-4}$ alkylcarbonyl, phenyl, nitroso or $C_{1-4}$ alkyl substituted by halogen, hydroxyl, carboxyl or sulfo;

$(R_1)_{0-3}$ and $(R_2)_{0-3}$ each independently are 0 to 3 identical or different groups, and each of $R_1$ and $R_2$ independently is selected from the group consisting of hydrogen, halogen, hydroxyl, carboxyl, sulfo, nitro, cyano, $C_{1-4}$ alkyl, $C_{1-4}$ alkoxy, ureido and amido;

B and B' each independently are selected from the group consisting of a direct bond, —$SO_2$— and —CONH—$(CH_2)_k$—$SO_2$—;

k is an integer between 1 to 6;

Z and Z' each independently are selected from the group consisting of —$SO_2$—U, —CONH—$(CH_2)_d$—$SO_2$—U, —O—$(CH_2)_r$—CONH—$(CH_2)_d$—$SO_2$—U, β-thiosulfatoethylsulfonyl and —N(R')—U';

d and r are integers independent of one another between 2 to 4;

U is —$CH_2CH_2W$ or —CH=$CH_2$;

W is a leaving group, —Cl, —$OSO_3H$ or —$OPO_3H$, which is eliminable by a base, a qualter salt selected from the group consisting of quaternary ammonium, pyridine, carboxypyridinium, methylpyridinium and carbonamidopyridinium, or a group of

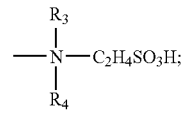

$R_3$ and $R_4$ each independently are hydrogen or $C_{1-4}$ alkyl;

U' is α,β-halopropionyl, α-haloacryloyl, β-halopropionyl or α-haloacryloyl;

R' is hydrogen or $C_{1-4}$ alkyl;

i and j are integers independent of one another between 0 to 2, and the sum of i and j is not 0; and m and n are integers independent of one another between 2 to 4.

In the reactive dyestuff of the formula (I) according to the present invention, $E_1$ and $E_2$ can each independently be a pyrazolone component. Preferably, $E_1$ and $E_2$ each independently are represented by the following formula (* represents a position for coupling),

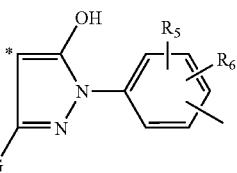

(I-1)

wherein, G is $C_{1-3}$ alkyl, carboxyl or $C_{2-5}$ alkylcarboxyl; and $R_5$ and $R_6$ each independently are selected from the group consisting of hydrogen, halogen, hydroxyl, carboxyl, sulfo, nitro, cyano, $C_{1-4}$ alkyl and $C_{1-4}$ alkoxy.

In the reactive dyestuff of the formula (I) according to the present invention, $E_1$ and $E_2$ can each independently be a benzene component. Preferably, $E_1$ and $E_2$ each independently are represented by the following formula (* represents a position for coupling),

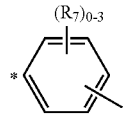

(I-2)

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $E_1$ and $E_2$ can each independently be a naphthalene component. Preferably, $E_1$ and $E_2$ each independently are represented by the following formulas (* represents a position for coupling),

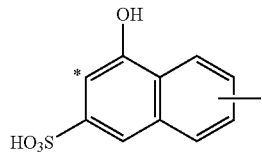
(I-3)

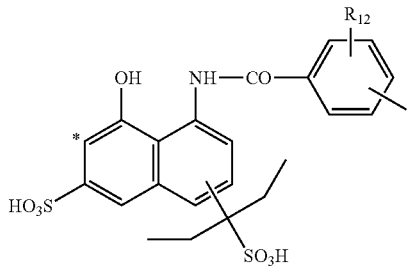
(I-4)

wherein, $R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy.

In the reactive dyestuff of the formula (I) according to the present invention, $E_1$ and $E_2$ can each independently be a monoazo component. Preferably, $E_1$ and $E_2$ each independently are represented by the following formulas (* represents a position for coupling),

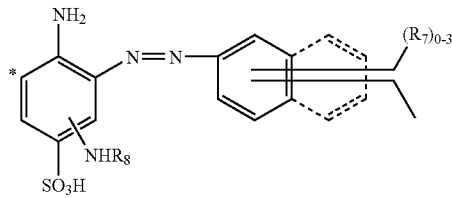
(I-5)

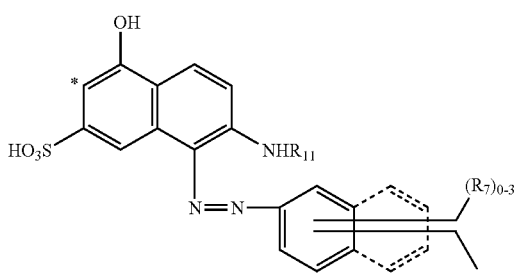
(I-6)

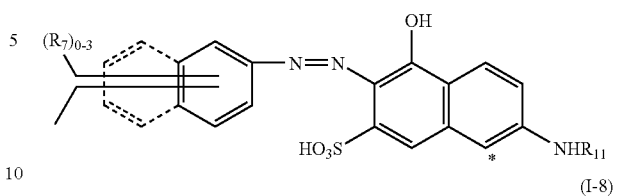
(I-7)

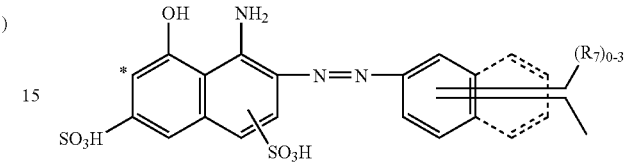
(I-8)

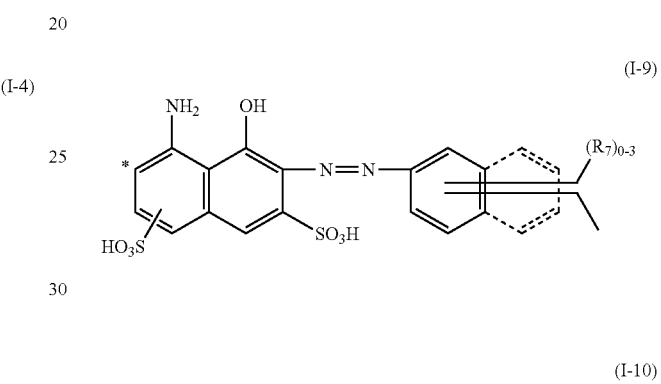
(I-9)

(I-10)

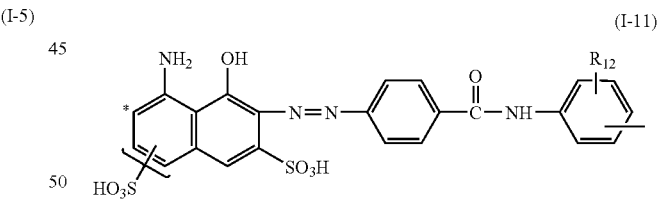
(I-11)

wherein, $(R_7)_{0-3}$ and $R_{12}$ are defined as above;

$R_8$ is hydrogen, $C_{1-4}$ alkyl, $C_{2-4}$ alkylcarboxyl or $C_{1-4}$ alkyl substituted by hydroxyl, cyano, carboxyl, sulfo, methoxycarbonyl, ethoxycarbonyl or acetoxy; and $R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo.

In the reactive dyestuff of the formula (I) according to the present invention, $E_1$ and $E_2$ can each independently be a disazo component. Preferably, $E_1$ and $E_2$ each independently are represented by the following formulas (* represents a position for coupling),

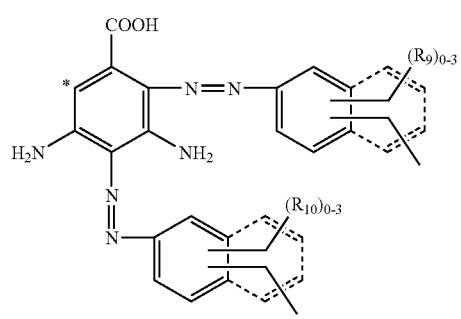
(I-12)

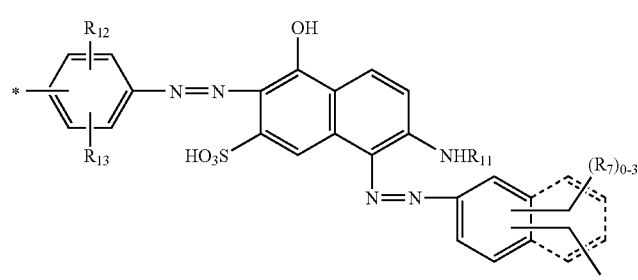
(I-13)

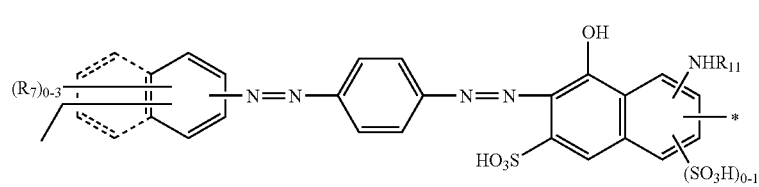
(I-14)

wherein, $(R_7)_{0-3}$, $R_{11}$ and $R_{12}$ are defined as above;

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_{10})_{0-3}$ is 0 to 3 identical or different groups, and each of $R_{10}$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl; and $R_{13}$ is selected from the group consisting of hydrogen, halogen, hydroxyl, carboxyl, sulfo, amino, nitro, cyano, acetylamino, uredio, $C_{1-4}$ alkyl and $C_{1-4}$ alkoxy.

In the reactive dyestuff of the formula (I) according to the present invention, $E_1$ and $E_2$ can each independently be a polyazo component. Preferably, $E_1$ and $E_2$ each independently are represented by the following formula (* represents a position for coupling), wherein, $(R_7)_{0-3}$ and $R_{11}$ are defined as above; and p is 2 or 3.

In the reactive dyestuff of the formula (I) according to the present invention, $E_1$ and $E_2$ can each independently be a metal complex azo component. Preferably, $E_1$ and $E_2$ each independently are represented by the following formulas (* represents a position for coupling),

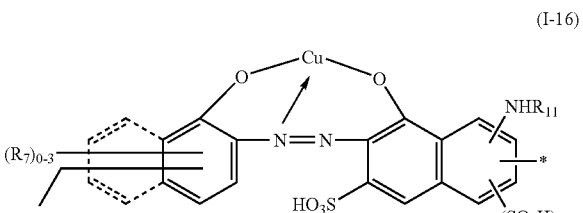
(I-16)

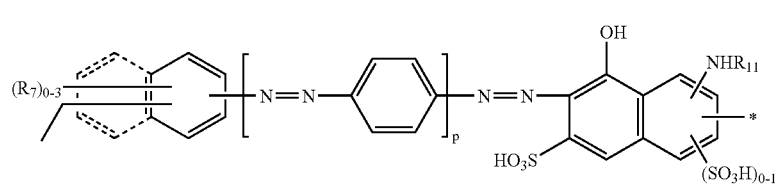
(I-15)

-continued (I-17)

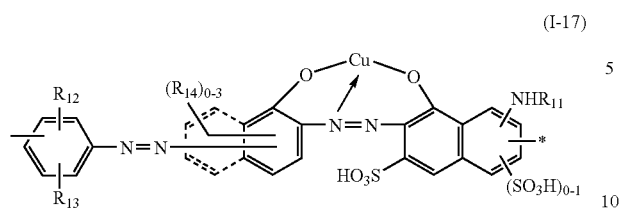

wherein, $(R_7)_{0-3}$, $R_{11}$, $R_{12}$ and $R_{13}$ are defined as above; and $(R_{14})_{0-3}$ is 0 to 3 identical or different groups, and each of $R_{14}$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

In the reactive dyestuff of the formula (I) according to the present invention, $E_1$ and $E_2$ can each independently be a pyrazolone component. More preferably, $E_1$ and $E_2$ each independently are represented by the following formula (* represents a position for coupling), (II-1)

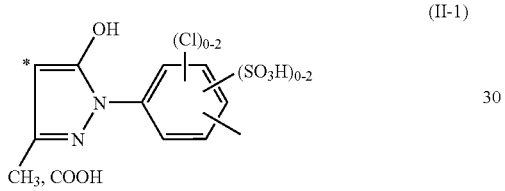

In the reactive dyestuff of the formula (I) according to the present invention, $E_1$ and $E_2$ can each independently be naphthalene component. More preferably, $E_1$ and $E_2$ each independently are represented by the following formula (* represents a position for coupling), (II-2)

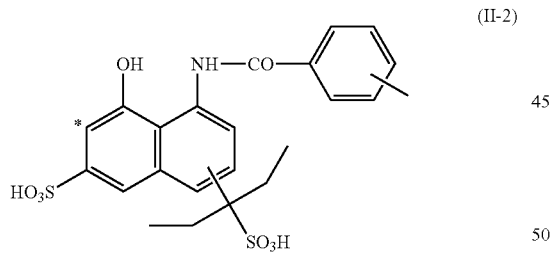

In the reactive dyestuff of the formula (I) according to the present invention, $E_1$ and $E_2$ can each independently be a monoazo component. More preferably, $E_1$ and $E_2$ each independently are represented by the following formulas (* represents a position for coupling), (II-3)

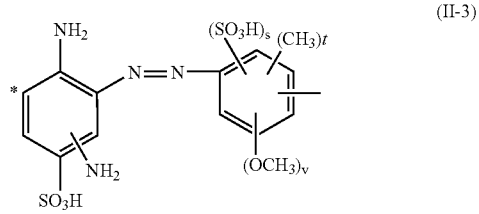

(II-4)

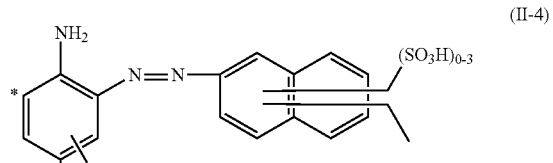

(II-5)

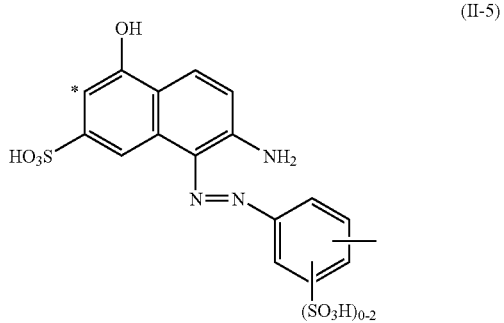

(II-6)

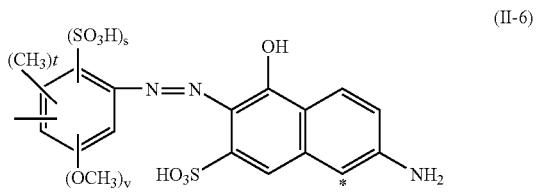

(II-7)

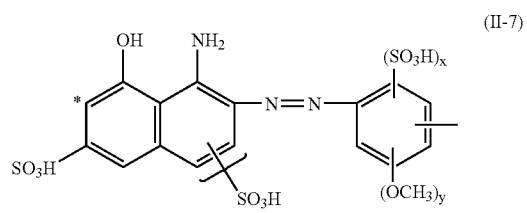

(II-8)

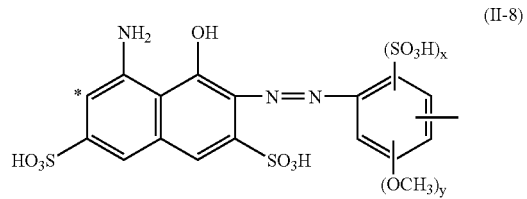

(II-9)

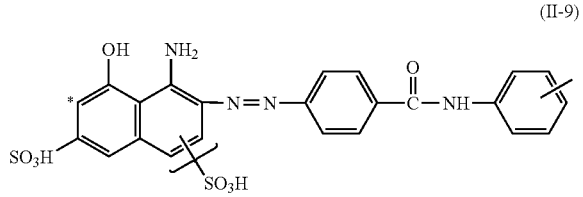

(II-10)

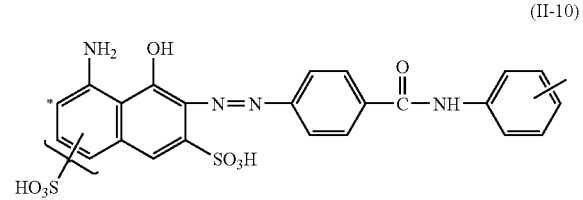

wherein, s, t and v are integers independent of one another between 0 to 2, and s+t+v is an integer between 0 to 3; and x and y are integers independent of one another between 0 to 2, and x+y is an integer between 0 to 3.

In the reactive dyestuff of the formula (I) according to the present invention, $E_1$ and $E_2$ can each independently be a disazo component. More preferably, $E_1$ and $E_2$ each independently are represented by the following formulas (* represents a position for coupling),

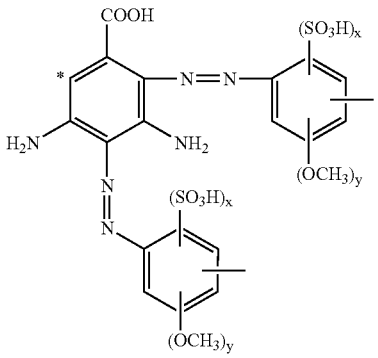
(II-11)

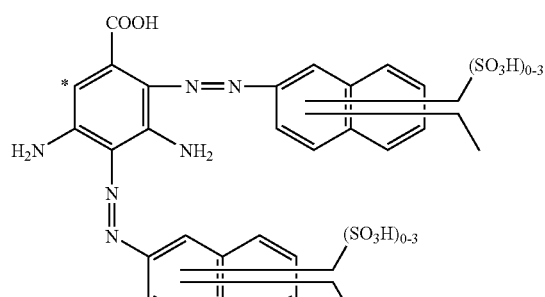
(II-12)

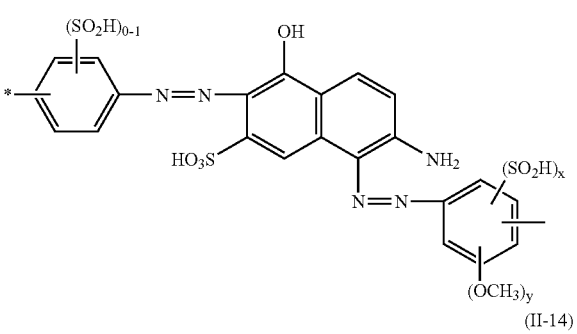
(II-13)

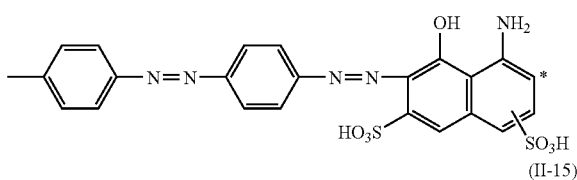
(II-14)

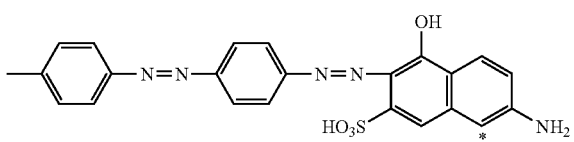
(II-15)

wherein, x and y are defined as above.

In the reactive dyestuff of the formula (I) according to the present invention, $E_1$ and $E_2$ can each independently be a metal complex azo component. More preferably, $E_1$ and $E_2$ each independently are represented by the following formula (* represents a position for coupling),

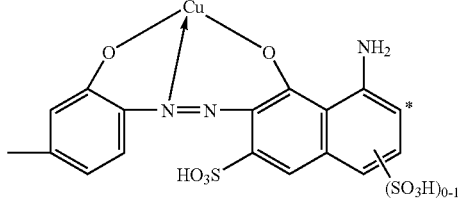
(II-16)

For describing conveniently, the compound is expressed as free acid in the specification. When produced or used, the dyestuffs of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

The dyestuffs of the present invention can be prepared by a conventional method. The synthetic routine for preparing the dyestuffs is not strictly limited. For example, a chromophore may be first prepared and then a desired dyestuff is synthesized, or a chromophore may be synthesized in the process for preparing a dyestuff.

The dyestuffs of the present invention can be applied to dye and print on many kinds of fiber materials, particularly cellulose fiber materials and cellulose-included fiber materials. The examples of the fiber materials are not limited. It can be natural or regenerated cellulose fibers, such as cotton, hemp, linen, jute, ramie, mucilage rayon, as well as cellulose-included fiber materials. The dyestuffs of the present invention can also be applied to dye and print fiber blended fabrics containing hydroxyl groups.

The dyestuffs of the present invention can be applied to the fiber material and fixed on the fiber in various ways, in particularly in the form of aqueous dyestuff solutions and printing pastes. They can be applied to dye and print on cellulose fibers by exhaustion dyeing, continuous dyeing, cold-pad-batch dyeing, printing or digital printing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as leveling agent, suspending agent and so on) can be added according to conventional method. The range of dyeing temperature is from 40° C. to 90° C. Preferably, the temperature for dyeing is from 50° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the one-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming.

In the two-bath pad dyeing method, the material is padded with a dye liquid and then dealt by a known inorganic neutral salt (e.g., sodium sulfate or sodium silicate). The dealt material is preferably dried and color fixed by baking or steaming as usual.

In the textile printing method, such as single printing method, the material is printed by printing slurry containing the known acid-binding agent (e.g., sodium bicarbonate) and is dried and color fixed by baking or steaming.

In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color.

The dyeing or printing methods employed in the process of the present invention are not limited to the above methods.

Other objects, advantages, and novel features of the invention will become more apparent from the following detailed description when taken in conjunction with the accompanying drawings.

BRIEF DESCRIPTION OF THE DRAWINGS none

DETAILED DESCRIPTION OF THE PREFERRED EMBODIMENT

For convenience in the statement, the following examples are exemplified for a more concrete description. Many examples have been used to illustrate the present invention. The examples sited below should not be taken as a limit to the scope of the invention. The compounds are represented in the form of free acid. However, in practice, they often exist as metallic salts, and most likely alkaline metallic salts, particularly sodium salts. Unless otherwise stated, the parts and percentage used in the following examples are based on weight, and the temperature is in Celsius degree (° C.).

Example 1

2.66 parts of p-Aminophenyl-β-vinyl-sulphone are dissolved in 20 parts of acetonitrile, followed by the addition of 10 parts of 25% $NH_3$ (aq), and the reaction is performed for 24 hours at room temperature. The product of the formula (1) is obtained by crystallization, filtration and dryness.

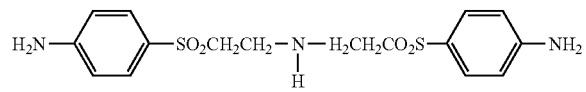

(1)

Example 2

1.83 parts of p-Aminophenyl-β-vinyl-sulphone are dissolved in 10 parts of acetonitrile, followed by the addition of 3.87 parts of 40% methylamine, and the reaction is performed for 4 hours at room temperature. The product of the formula (2) is obtained by recrystallization in butanol, filtration and dryness.

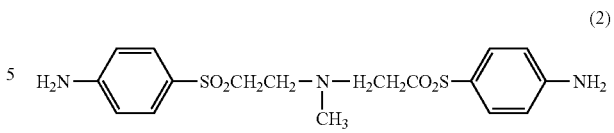

(2)

Example 3

2.66 parts of p-Aminophenyl-β-vinyl-sulphone are dissolved in 30 parts of acetonitrile, followed by the addition of 11.46 parts of 70% ethylamine, and the reaction is performed for 1 hour at 20° C. The product of the formula (3) is obtained by crystallization, filtration and dryness.

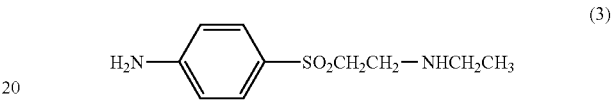

(3)

Subsequently, 2.29 parts of the compound (3) react with 1.83 parts of p-Aminophenyl-β-vinyl-sulphone for 3 hours at 150° C. The product of the formula (4) is obtained by cooling, recrystallization in butanol, filtration and dryness.

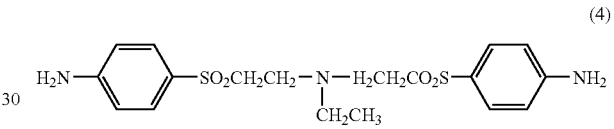

(4)

Example 4

1.92 pats of the compound (1) prepared in Example 1 are added into 10 parts of acetic acid, followed by the addition of 0.42 part of sodium acetate and 9.0 parts of acetic anhydride. The reaction is performed for 2 hours at 40° C. Finally, the product of the formula (5) is obtained by column chromatography.

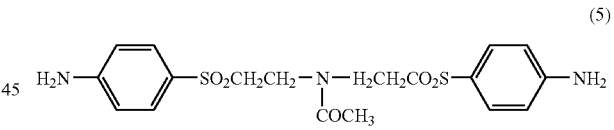

(5)

Example 5

3.66 parts of p-Aminophenyl-β-vinyl-sulphone are dissolved in 40 parts of acetonitrile, followed by the addition of 1.22 parts of ethanolamine, and the reaction is performed for 12 hours at room temperature. The product of the formula (6) is obtained by crystallization, filtration and dryness.

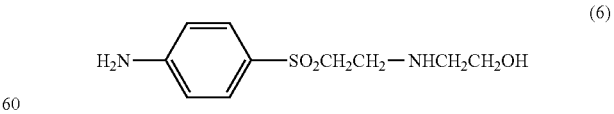

(6)

Subsequently, 5 parts of m-Aminophenyl-β-vinyl-sulphone are dissolved in 50 parts of acetonitrile, followed by the addition of 5 parts of the compound (6), and the reaction is performed for 12 hours at room temperature. The product of the formula (7) is obtained by crystallization, filtration and dryness.

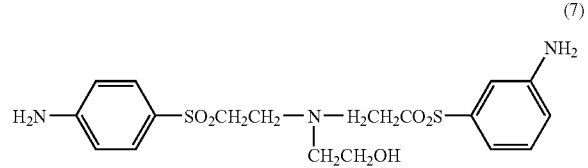
(7)
Examples 6-58
According to the synthetic methods of Examples 1-5, the compounds (8)-(60) with N,N-dialkylamino bridge group are obtained, as shown in Table 1.

TABLE 1-continued
| Example | Structure |
|---|---|
| 13 | 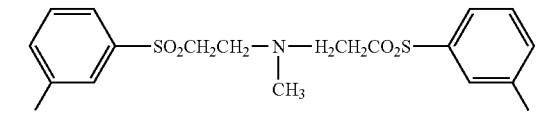 (15) |
| 14 | 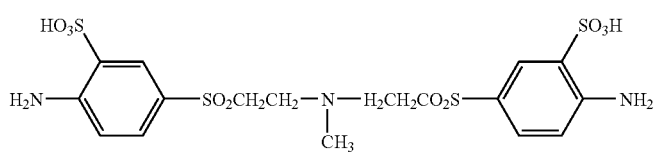 (16) |
| 15 | 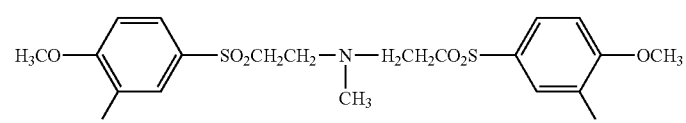 (17) |
| 16 | 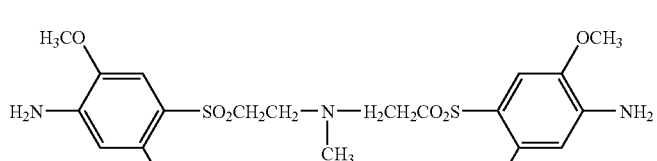 (18) |
| 17 | 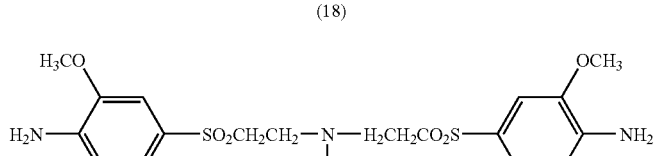 (19) |
| 18 | 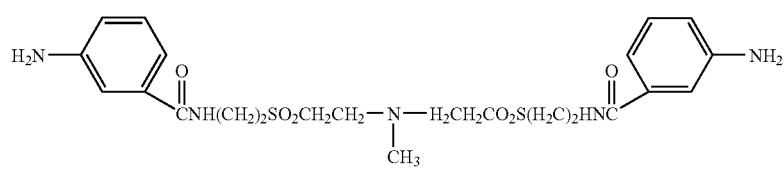 (20) |
| 19 | 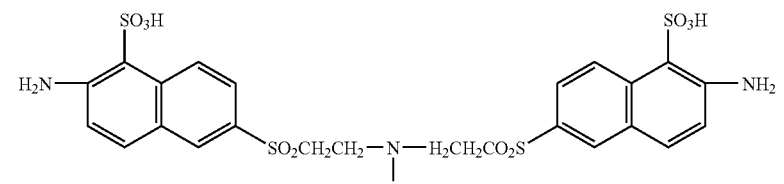 (21) |
| 20 | 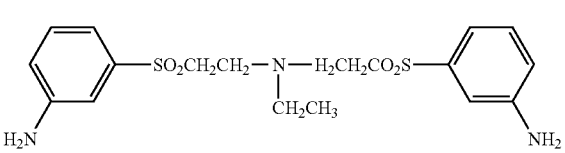 (22) |

TABLE 1-continued

| Example | Structure |
|---|---|
| 21 | (23) 2-amino-5-[2-[N-ethyl-N-[2-(4-amino-3-sulfophenylthio)carbonylethyl]amino]ethylsulfonyl]benzenesulfonic acid derivative: $HO_3S$ and $SO_3H$ groups ortho to $NH_2$; linker $-SO_2CH_2CH_2-N(CH_2CH_3)-CH_2CH_2CO_2S-$ |
| 22 | (24) Analogous structure with $H_3CO$ (para to linker) and $H_2N$ (meta) on each ring; central N bears $CH_2CH_3$ |
| 23 | (25) Each ring substituted with $H_3CO$, $H_2N$, $CH_3$; linker as above with N–$CH_2CH_3$ |
| 24 | (26) Each ring bears two $OCH_3$ groups and $NH_2$; linker with N–$CH_2CH_3$ |
| 25 | (27) $H_2N$–C$_6$H$_4$–C(=O)NH(CH$_2$)$_2$SO$_2$CH$_2$CH$_2$–N(CH$_2$CH$_3$)–CH$_2$CH$_2$CO$_2$S(H$_2$C)$_2$NHC(=O)–C$_6$H$_4$–NH$_2$ |
| 26 | (28) $H_2N$–C$_6$H$_4$–SO$_2$CH$_2$CH$_2$–N(CH$_2$CH$_2$OH)–CH$_2$CH$_2$CO$_2$S–C$_6$H$_4$–NH$_2$ (para-substituted) |
| 27 | (29) meta-substituted analog with N–$CH_2CH_2OH$ |
| 28 | (30) $HO_3S$/$SO_3H$ and $H_2N$/$NH_2$ substituted rings; linker with N–$CH_2CH_2OH$ |

TABLE 1-continued
| Example | Structure |
|---|---|
| 29 | 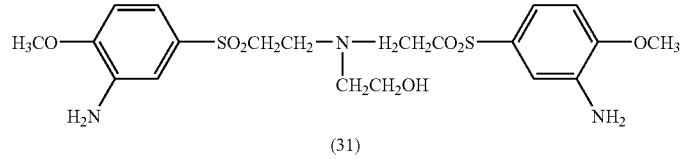 (31) |
| 30 | 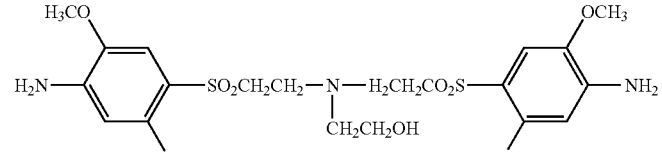 (32) |
| 31 | 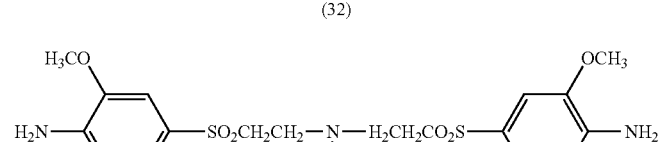 (33) |
| 32 | 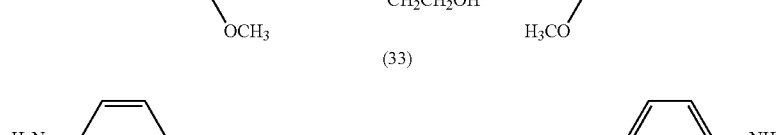 (34) |
| 33 | 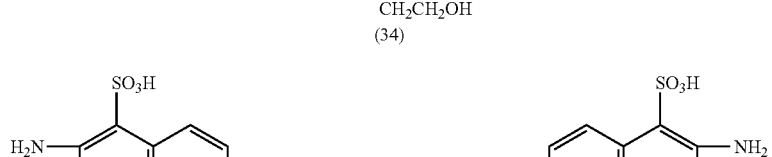 (35) |
| 34 | 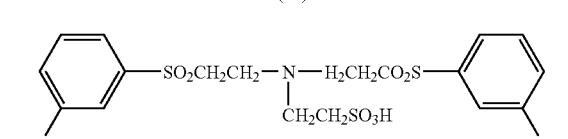 (36) |
| 35 | 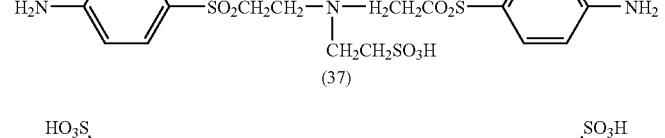 (37) |
| 36 | 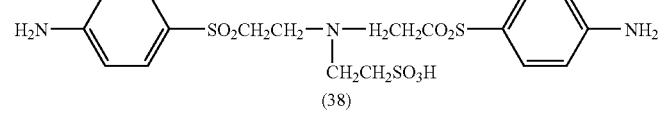 (38) |

TABLE 1-continued

| Example | Structure |
|---|---|
| 37 | (39) |
| 38 | (40) |
| 39 | (41) |
| 40 | (42) |
| 41 | (43) |
| 42 | (44) |
| 43 | (45) |
| 44 | (46) |

TABLE 1-continued
| Example | Structure |
|---|---|
| 45 | 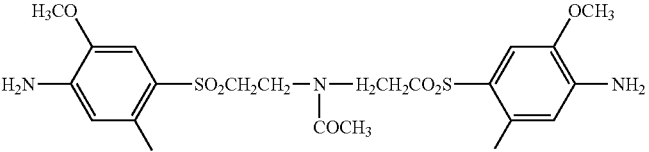 (47) |
| 46 | 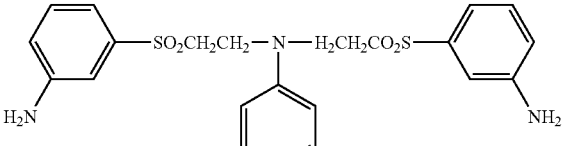 (48) |
| 47 | 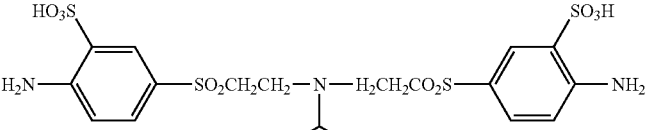 (49) |
| 48 |  (50) |
| 49 | 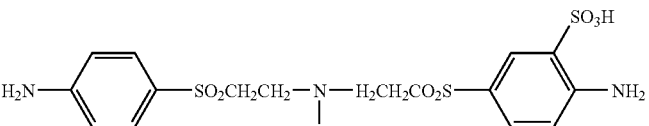 (51) |
| 50 | 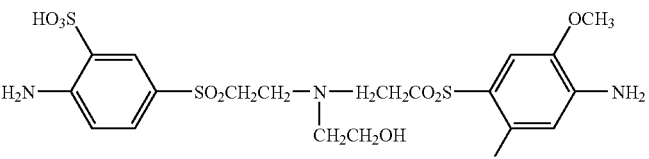 (52) |
| 51 | 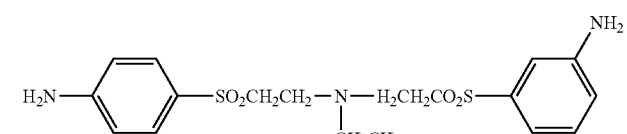 (53) |

TABLE 1-continued

| Example | Structure |
|---|---|
| 52 | 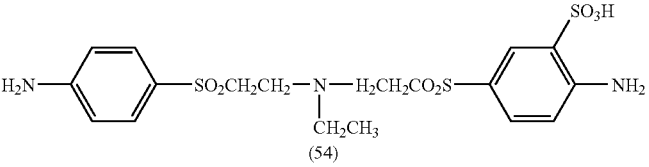 (54) |
| 53 | 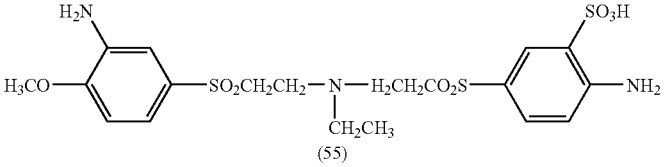 (55) |
| 54 | 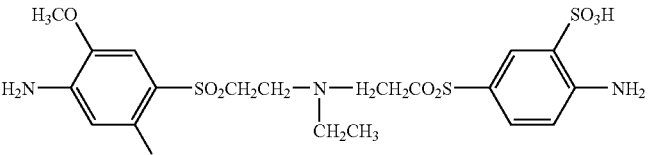 (56) |
| 55 | 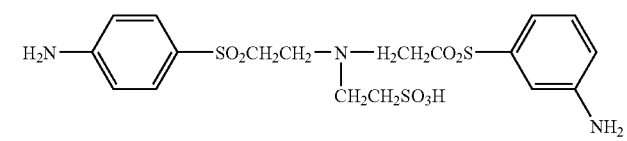 (57) |
| 56 | 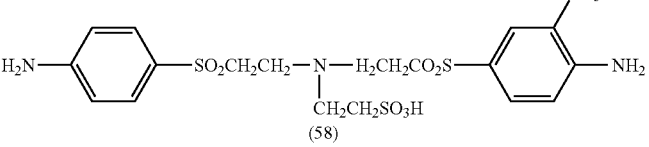 (58) |
| 57 | 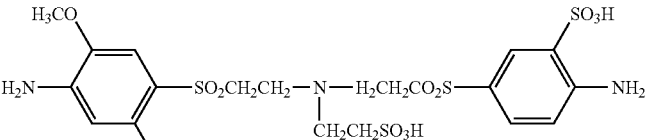 (59) |
| 58 | 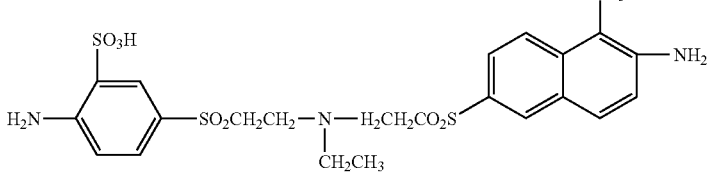 (60) |

Example 59

19.2 parts of the compound (1) are dispersed in 150 parts of ice water, and then 35.4 parts of 32% HCl aqueous solution are added therein with thorough stirring, followed by the addition of 10.5 parts of sodium nitrite with continuous stirring at a temperature in the range of 0° C. to 5° C. until the diazotization is accomplished to obtain a solution (A).

Subsequently, 28.1 parts of 4-β-sulfatoethylsulfone-aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 31.9 parts of 4-amino-5-hydroxy-2,7-napthalenedisulfonic acid powder are added into the above solution, and the pH value of the reaction solution is gradually adjusted to 3 by the addition of 10 parts of NaHCO$_3$ with continuous stirring until the coupling reaction is accomplished. Next, the solution (A) afforded by the aforementioned process is added therein, and the pH value of the reaction solution is adjusted to 5 by the addition of 21 parts of NaHCO$_3$ with continuous stirring until the coupling reaction is accomplished. The navy blue product is obtained by salting-out, filtration and dryness. The structure of the product is shown in the following formula.

Example 60

28.1 parts of 4-β-sulfatoethylsulfone-aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 31.9 parts of 4-amino-5-hydroxy-2,7-napthalenedisulfonic acid powder are added into the above solution, and the pH value of the reaction solution is adjusted to 2-3 by the addition of 10 parts of NaHCO$_3$ with continuous stirring until the coupling reaction is accomplished.

Subsequently, 19.8 parts of the compound (2) are dispersed in 150 parts of ice water, and then 25.6 parts of 32% HCl aqueous solution are added therein with thorough stirring, followed by the addition of 7.1 parts of sodium nitrite with continuous stirring at a temperature in the range of 0° C. to 5° C. until the diazotization is accomplished. Then, the coupling solution afforded by the aforementioned process is added therein, and the pH value of the reaction solution is adjusted to 5 by the addition of 12 parts of NaHCO$_3$ with continuous stirring until the coupling reaction is accomplished. The navy blue product is obtained by salting-out, filtration and dryness. The structure of the product is shown in the following formula.

Example 61

20.6 parts of the compound (4) are dispersed in 150 parts of ice water, and then 25.6 parts of 32% HCl aqueous solution are added therein with thorough stirring, followed by the addition of 7.1 parts of sodium nitrite with continuous stirring at a temperature in the range of 0° C. to 5° C. until the diazotization is accomplished. Subsequently, 31.9 parts of

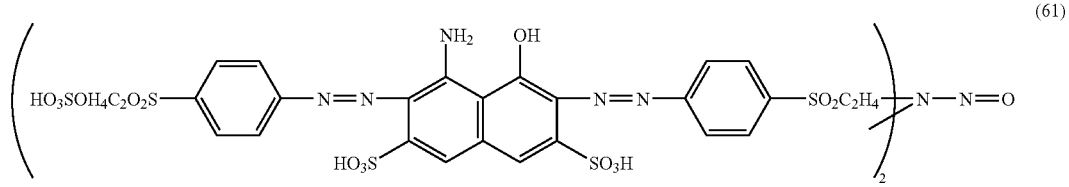

(61)

4-amino-5-hydroxy-2,7-naphthalenedisulfonic acid powder are added therein, and the pH value of the reaction solution is adjusted to 2-3 by the addition of 6 parts of NaHCO$_3$ with continuous stirring until the coupling reaction is accomplished.

28.1 parts of 4-β-sulfatoethylsulfone-aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, the coupling solution afforded by the aforementioned process is added therein, and the pH value of the reaction solution is adjusted to 5 by the addition of 12 parts of NaHCO$_3$ with continuous stirring until the coupling reaction is accomplished. The navy blue product is obtained by salting-out, filtration and dryness. The structure of the product is shown in the following formula.

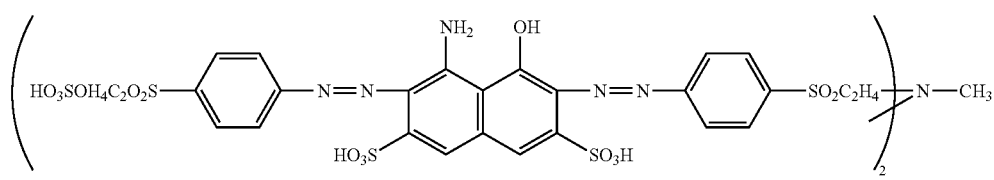

(62)

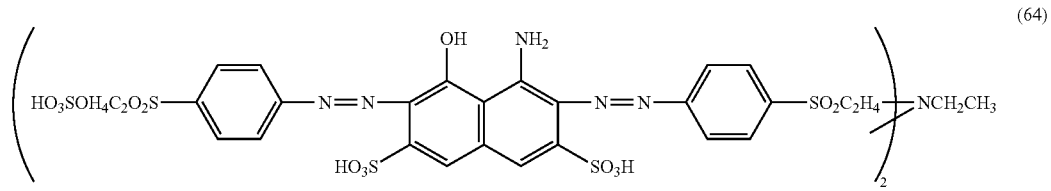

(64)

Example 62

36.1 parts of 1-aminobenzene-4-(β-sulfatoethylsulfone)-2-sulfonic acid and 30 parts of 32% HCl aqueous solution are dispersed in 150 parts of 0° C. water with thorough stirring, followed by the addition of 7.2 parts of sodium nitrite with continuous stirring, until the diazotization is accomplished. Then, 23.9 parts of 2-amino-5-hydroxynaphthalene-7-sulfonic acid are added therein, and the pH value of the reaction solution is adjusted to 5 by the addition of 12 parts of NaHCO₃ with continuous stirring until the coupling reaction is accomplished. Subsequently, 8 parts of NaOH and 3.9 parts of 40% methylamine are added therein to perform reaction for 12 hours at room temperature. The red product of the following formula (65) is obtained by salting-out, filtration and dryness.

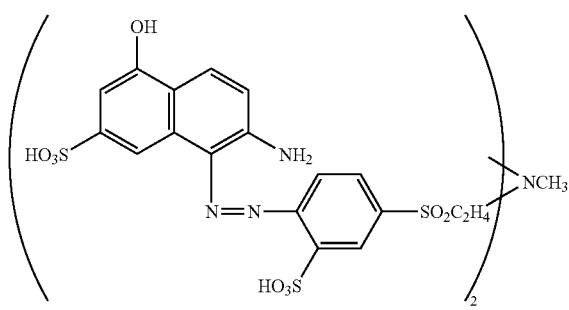

(65)

31.1 parts of 2-methoxyl-5-(β-sulfatoethylsulfone) aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 52 parts of the compound (65) are added therein, and the pH value of the reaction solution is adjusted to 5 by the addition of 12 parts of NaHCO₃ with continuous stirring until the coupling reaction is accomplished. The red product is obtained by salting-out, filtration and dryness. The structure of the product is shown in the following formula.

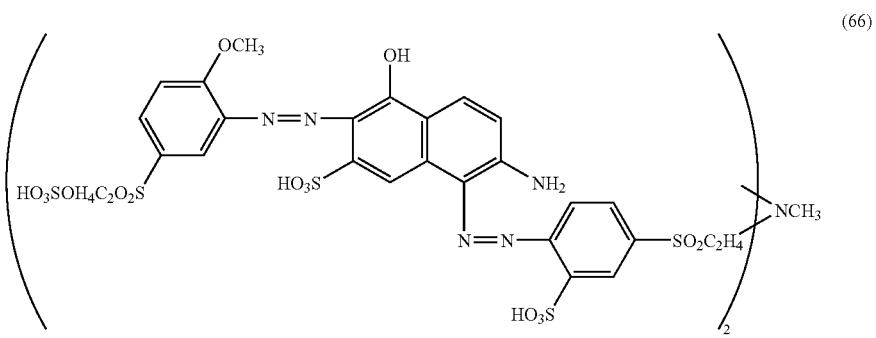

(66)

Example 63

36.1 parts of 1-aminobenzene-4-(β-sulfatoethylsulfone)-2-sulfonic acid and 30 parts of 32% HCl aqueous solution are dispersed in 150 parts of 0° C. water with thorough stirring, followed by the addition of 7.2 parts of sodium nitrite with continuous stirring, until the diazotization is accomplished. Then, 18.8 parts of 2,4-diaminobenzene-1-sulfonic acid powder are added therein, and the pH value of the reaction solution is adjusted to 2 by the addition of 5 parts of NaHCO₃ with continuous stirring until the coupling reaction is accomplished to obtain a yellow solution.

Subsequently, 21.3 parts of the compound (5) are dispersed in 150 parts of ice water, and then 25.6 parts of 32% HCl aqueous solution are added therein with thorough stirring, followed by the addition of 7.2 parts of sodium nitrite with continuous stirring at a temperature in the range of 0° C. to 5° C. until the diazotization is accomplished. Then, the resultant solution is added into the aforementioned yellow solution, and the pH value of the reaction solution is adjusted to 5 by the addition of 12 parts of NaHCO₃ with continuous stirring until the coupling reaction is accomplished. The orange product is obtained by salting-out, filtration and dryness. The structure of the product is shown in the following formula.

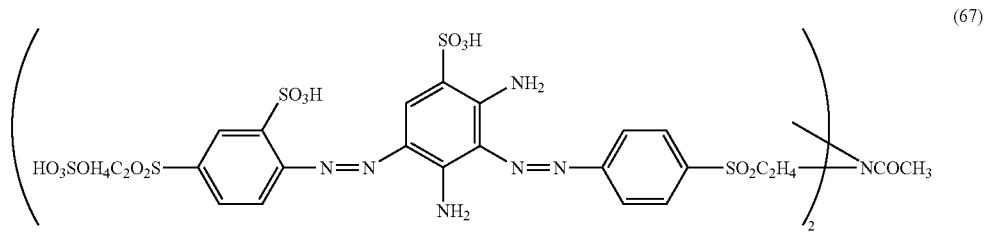
(67)

Example 64

21.4 parts of the compound (7) are dispersed in 150 parts of ice water, and then 25.6 parts of 32% HCl aqueous solution are added therein with thorough stirring, followed by the addition of 7.1 parts of sodium nitrite with continuous stirring at a temperature in the range of 0° C. to 5° C. until the diazotization is accomplished to obtain a solution (C).

Subsequently, 28.1 parts of 4-β-sulfatoethylsulfone-aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 31.9 parts of 4-amino-5-hydroxy-2,7-napthalenedisulfonic acid powder are added into the above solution, and the pH value of the reaction solution is adjusted to 3 by the addition of 10 parts of NaHCO$_3$ with continuous stirring until the coupling reaction is accomplished. Next, the solution (C) afforded by the aforementioned process is added therein, and the pH value of the reaction solution is adjusted to 5 by the addition of 12 parts of NaHCO$_3$ with continuous stirring until the coupling reaction is accomplished. The navy blue product is obtained by salting-out, filtration and dryness. The structure of the product is shown in the following formula.

4-amino-5-hydroxy-2,7-napthalenedisulfonic acid powder are added into the above solution, and the pH value of the reaction solution is adjusted to 2-3 by the addition of 10 parts of NaHCO$_3$ with continuous stirring until the coupling reaction is accomplished. Subsequently, 8 parts of NaOH and 23.4 parts of 40% methylamine are added therein to perform reaction for 12 hours at room temperature. The red product of the following formula (69) is obtained by salting-out, filtration and dryness.

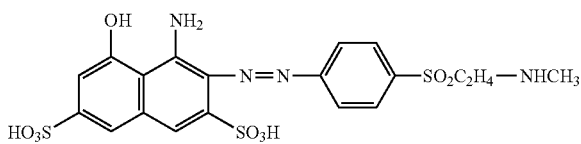
(69)

28.1 parts of 3-(β-sulfatoethylsulfone) aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 31.9

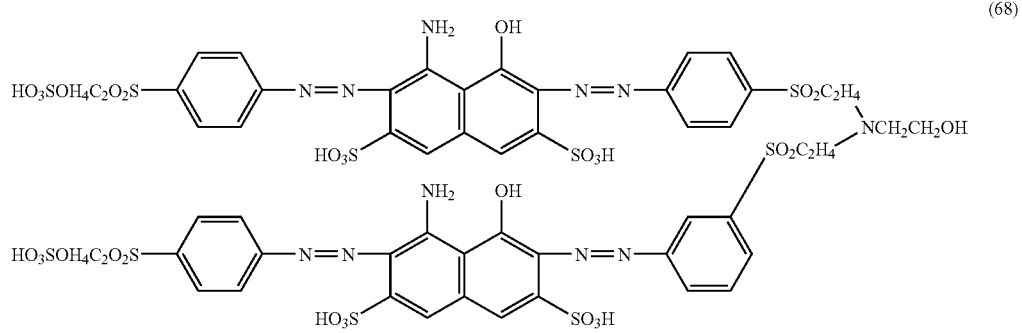
(68)

Example 65

28.1 parts of 4-β-sulfatoethylsulfone-aniline and 25.6 parts of 32% HCl aqueous solution are added into 300 parts of 0° C. water with thorough stirring to form a dispersion solution, followed by the addition of 7.2 parts of sodium nitrite with continuous stirring at a temperature in the range of 0° C. to 5° C. until the diazotization is accomplished. Then, 31.9 parts of parts of 4-amino-5-hydroxyl-1,7-naphthalenedisulfonic acid powder are added therein, and the pH value of the reaction solution is adjusted to 3 by the addition of 10 parts of NaHCO$_3$ with continuous stirring until the coupling reaction is accomplished. Subsequently, 8 parts of NaOH and 54 parts of the compound (69) are added therein with continuous stirring until the reaction is accomplished. The red product of the following formula (70) is obtained by salting-out, filtration and dryness.

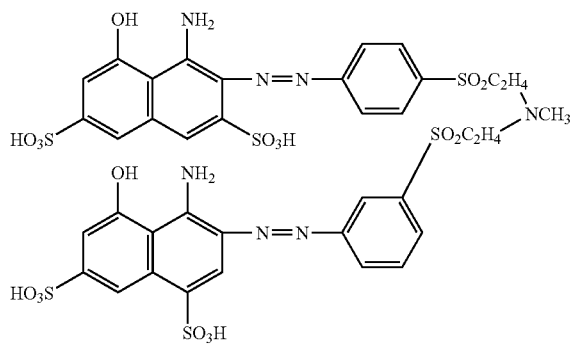

(70)

62.2 parts of 2-methoxyl-5-(β-sulfatoethylsulfone) aniline and 52 parts of 32% HCl aqueous solution are added into 300 parts of 0° C. water with thorough stirring to form a dispersion solution, followed by the addition of 14.4 parts of sodium nitrite with continuous stirring at a temperature in the range of 0° C. to 5° C. until the diazotization is accomplished. Then, 105 parts of the compound (70) are added therein, and the pH value of the reaction solution is adjusted to 5 by the addition of 18 parts of NaHCO$_3$ with continuous stirring until the coupling reaction is accomplished. The navy blue product is obtained by salting-out, filtration and dryness. The asymmetric structure of the product is shown in the following formula.

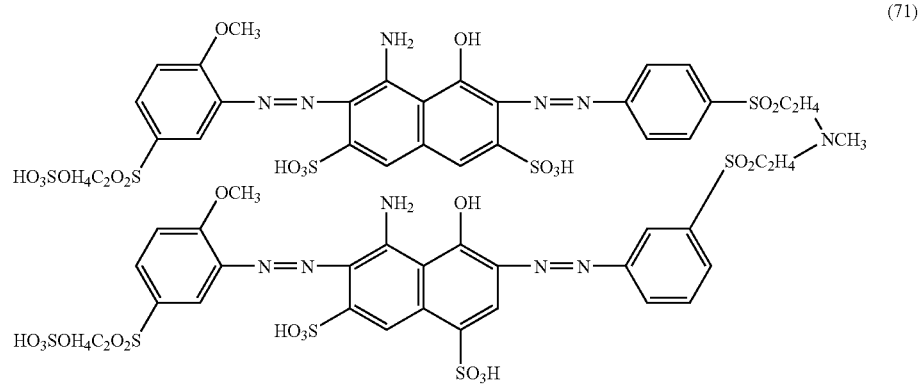

(71)

Examples 66-192

According to the synthetic methods of Examples 59-65, the reactive dyestuffs (72)-(198) with N,N-dialkylamino bridge group are obtained, as shown in Table 2.

TABLE 2

| Example | Structure | Color Appearance |
|---|---|---|
| 66 | (72) | Navy |
| 67 | (73) | Navy |

TABLE 2-continued
| Example | Structure | Color Appearance |
|---|---|---|
| 68 | (74) | Navy |
| 69 | (75) | Navy |
| 70 | (76) | Navy |
| 71 | (77) | Navy |
| 72 | (78) | Navy |
| 73 | (79) | Navy |
| 74 | (80) | Navy |
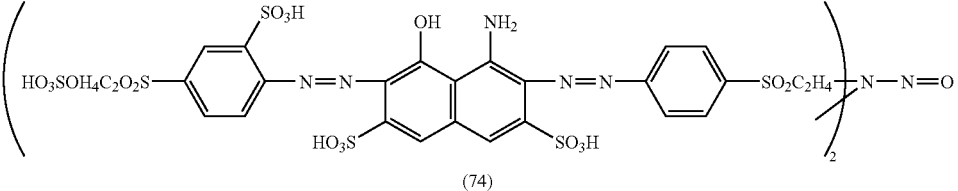
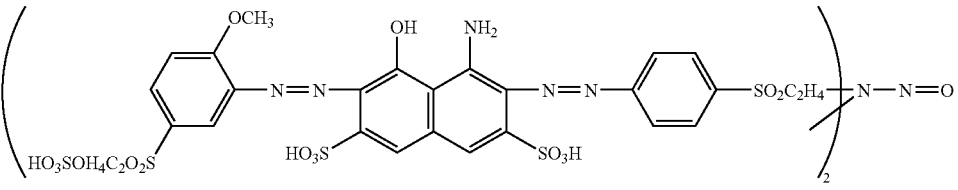
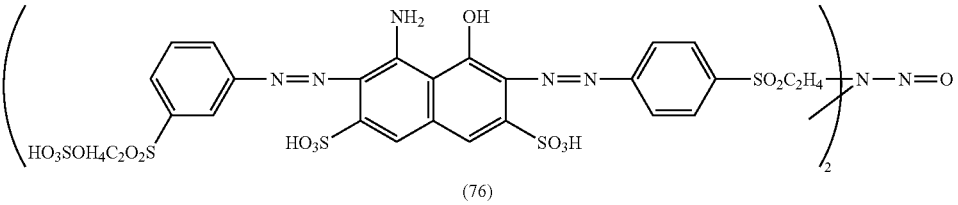
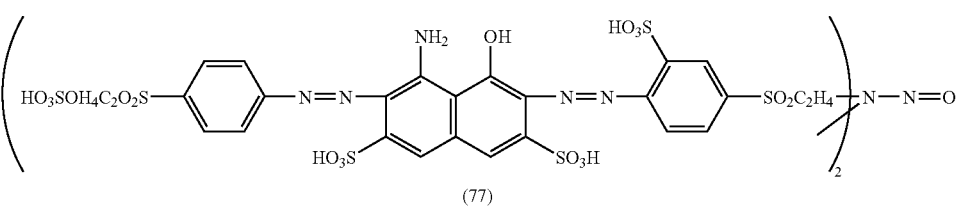
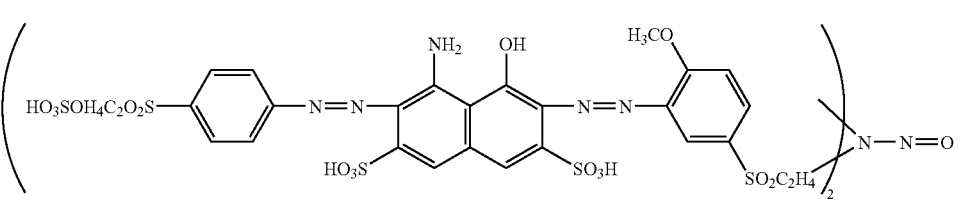
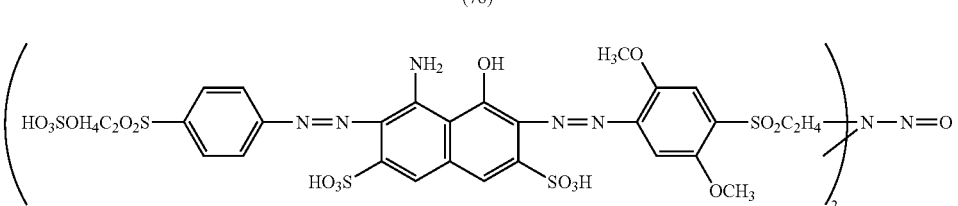
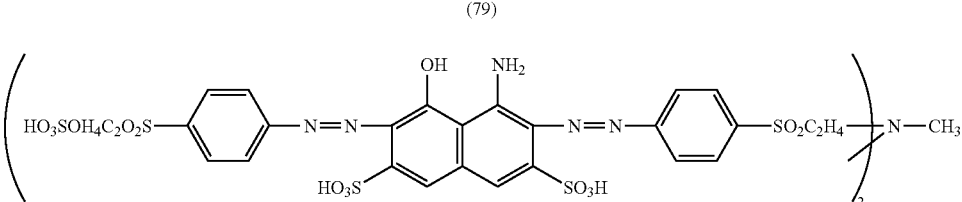

TABLE 2-continued
| Example | Structure | Color Appearance |
|---|---|---|
| 75 | (81) | Navy |
| 76 | (82) | Navy |
| 77 | (83) | Navy |
| 78 | (84) | Navy |
| 79 | (85) | Navy |
| 80 | (86) | Navy |
| 81 | (87) | Navy |
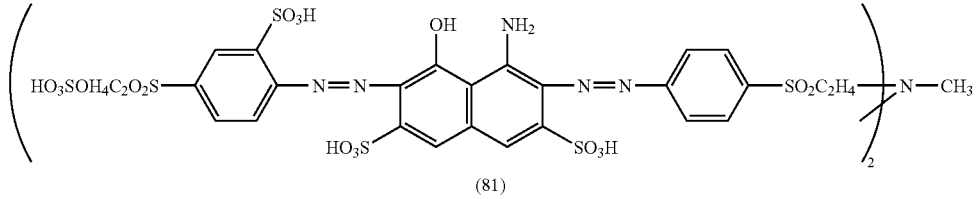
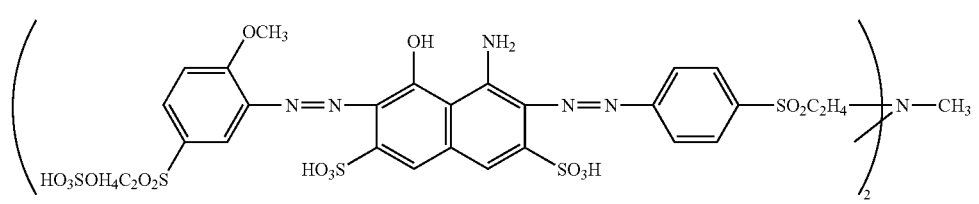
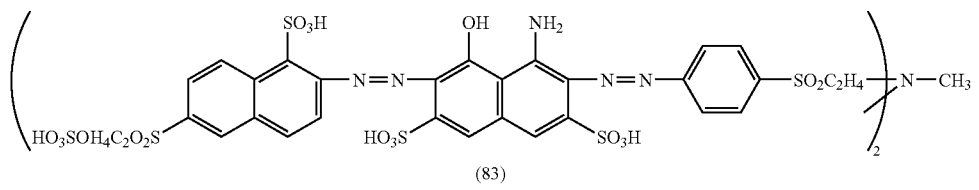
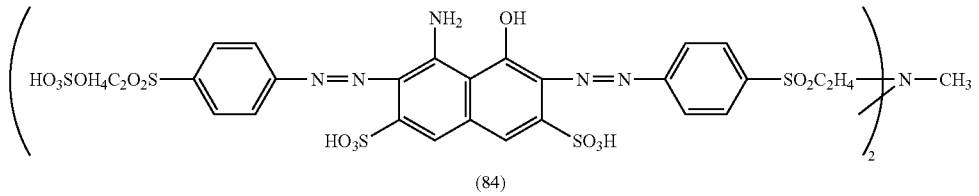
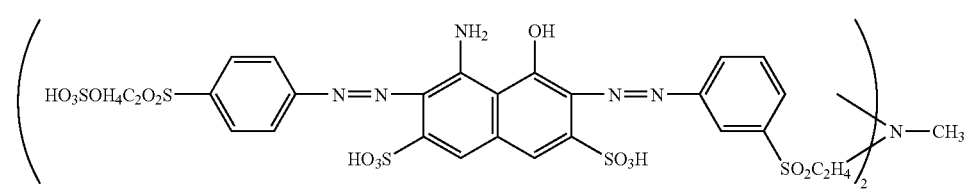
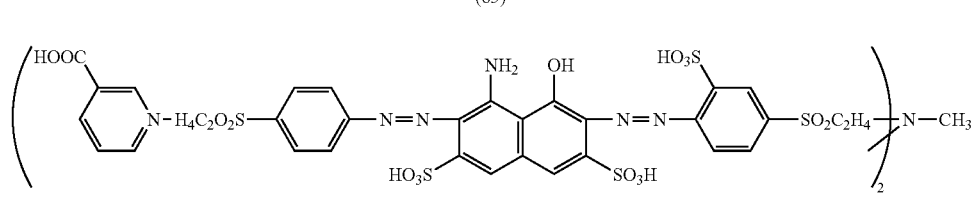
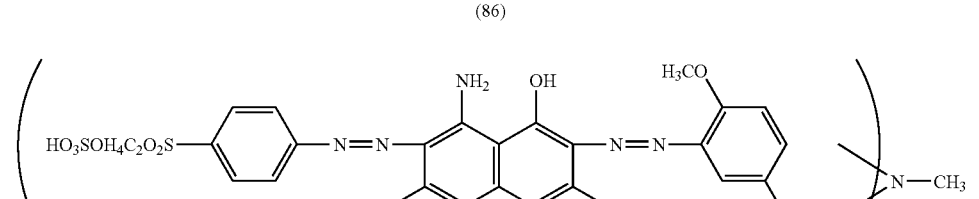

TABLE 2-continued

| Example | Structure | Color Appearance |
|---|---|---|
| 82 | (88) | Navy |
| 83 | (89) | Navy |
| 84 | (90) | Navy |
| 85 | (91) | Navy |
| 86 | (92) | Navy |
| 87 | (93) | Navy |
| 88 | (94) | Navy |

TABLE 2-continued

| Example | Structure | Color Appearance |
|---|---|---|
| 89 | (95) | Navy |
| 90 | (96) | Navy |
| 91 | (97) | Navy |
| 92 | (98) | Navy |
| 93 | (99) | Navy |
| 94 | (100) | Navy |
| 95 | (101) | Navy |

TABLE 2-continued

| Example | Structure | Color Appearance |
|---|---|---|
| 96 | (102) | Navy |
| 97 | (103) | Navy |
| 98 | (104) | Navy |
| 99 | (105) | Navy |
| 100 | (106) | Navy |
| 101 | (107) | Navy |
| 102 | (108) | Navy |

TABLE 2-continued
| Example | Structure | Color Appearance |
|---|---|---|
| 103 | (109) 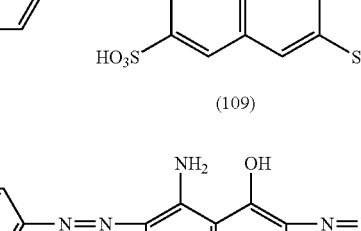 | Navy |
| 104 | (110) 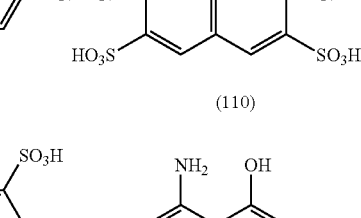 | Navy |
| 105 | (111) 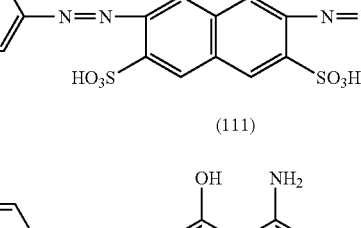 | Navy |
| 106 | (112) 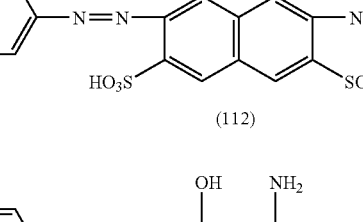 | Navy |
| 107 | (113) 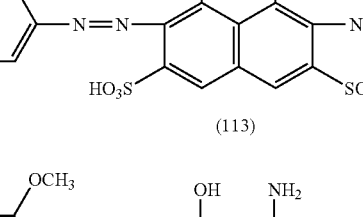 | Navy |
| 108 | (114) 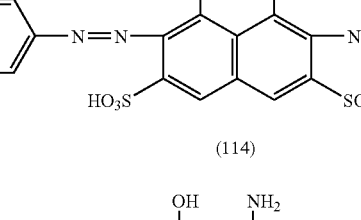 | Navy |
| 109 | (115) 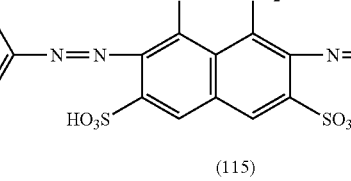 | Navy |

TABLE 2-continued
| Example | Structure | Color Appearance |
|---|---|---|
| 110 | 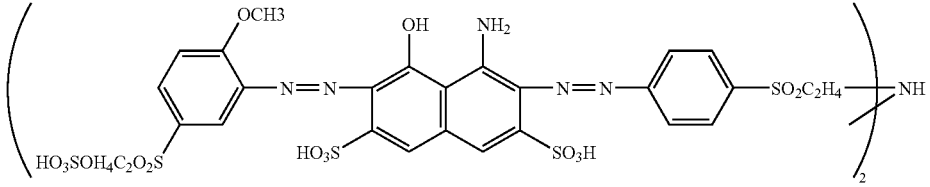 (116) | Navy |
| 111 | 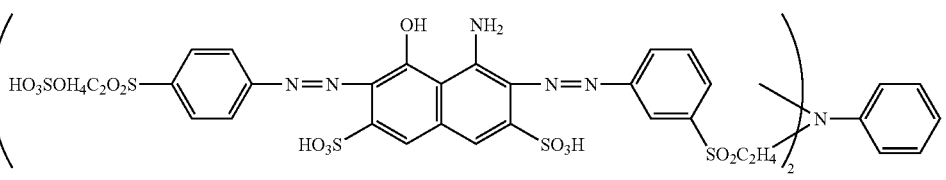 (117) | Navy |
| 112 | 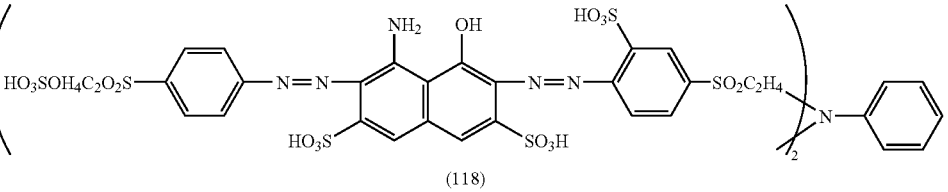 (118) | Navy |
| 113 | 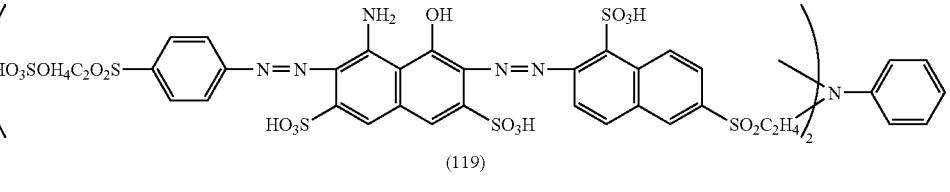 (119) | Navy |
| 114 | 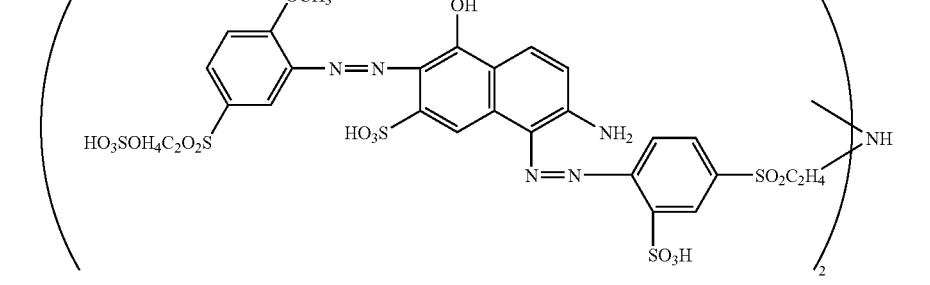 (120) | Red |
| 115 | 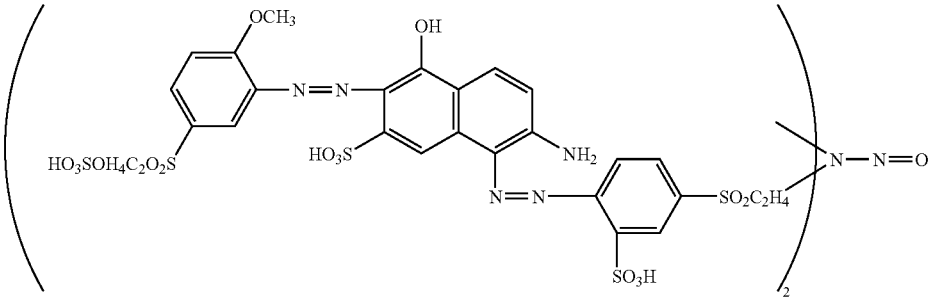 (121) | Red |

TABLE 2-continued

| Example | Structure | Color Appearance |
|---|---|---|
| 116 | (122) | Red |
| 117 | (123) | Red |
| 118 | (124) | Red |
| 119 | (125) | Red |

TABLE 2-continued

| Example | Structure | Color Appearance |
|---|---|---|
| 120 | (126) | Red |
| 121 | (127) | Red |
| 122 | (128) | Red |
| 123 | (129) | Red |

TABLE 2-continued
| Example | Structure | Color Appearance |
|---|---|---|
| 124 | 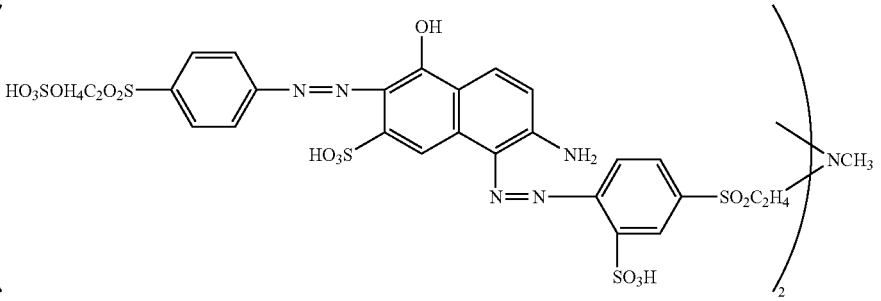 (130) | Red |
| 125 | 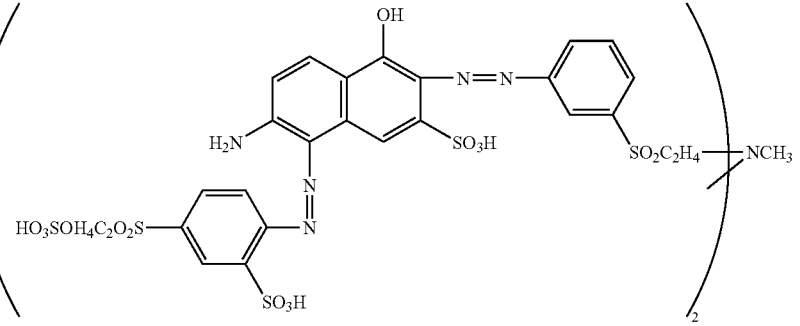 (131) | Red |
| 126 | 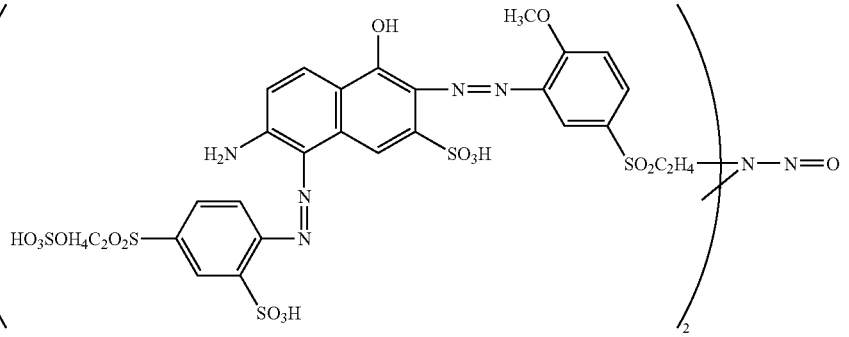 (132) | Red |
| 127 | 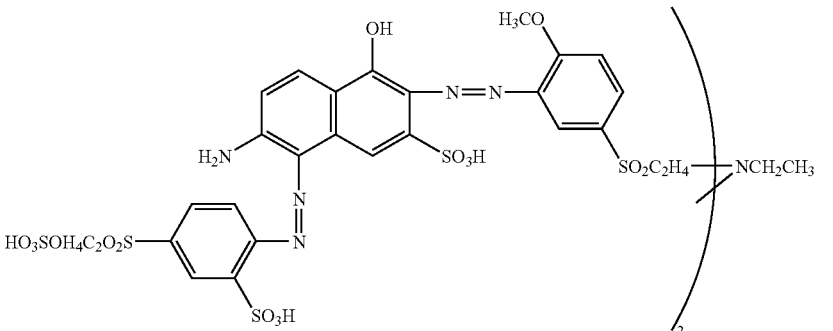 (133) | Red |

TABLE 2-continued
| Example | Structure | Color Appearance |
|---|---|---|
| 128 | (134) | Red |
| 129 | (135) | Red |
| 130 | (136) | Purple |
| 131 | (137) | Purple |
| 132 | (138) | Purple |
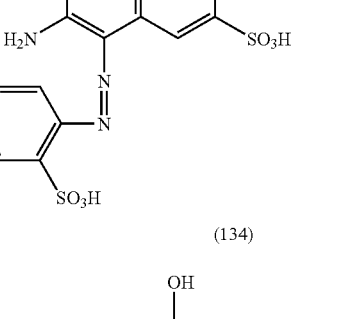
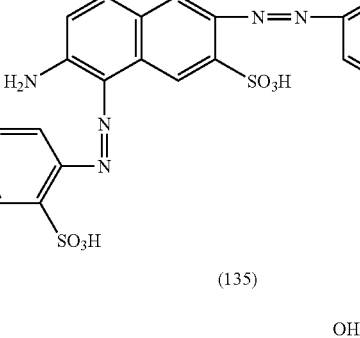
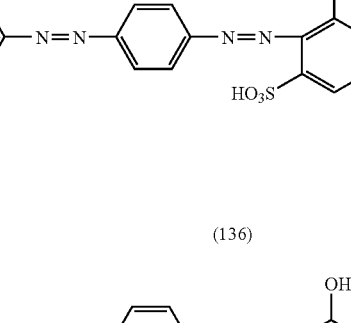
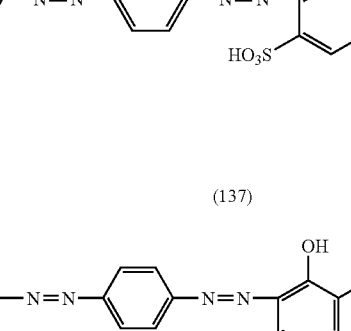

TABLE 2-continued

| Example | Structure | Color Appearance |
|---|---|---|
| 133 | (139) | Purple |
| 134 | (140) | Purple |
| 135 | (141) | Red |
| 136 | (142) | Red |
| 137 | (143) | Red |
| 138 | (144) | Red |

TABLE 2-continued
| Example | Structure | Color Appearance |
|---|---|---|
| 139 | (145) | Red |
| 140 | (146) | Orange |
| 141 | (147) | Orange |
| 142 | (148) | Orange |
| 143 | (149) | Orange |
| 144 | (150) | Orange |
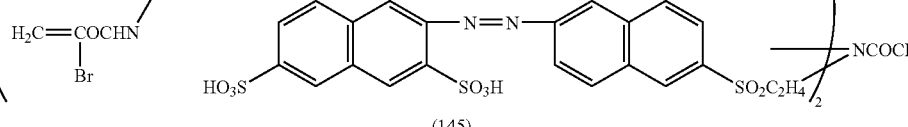
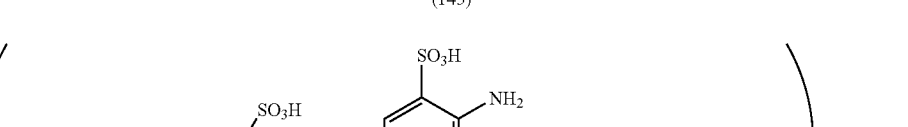
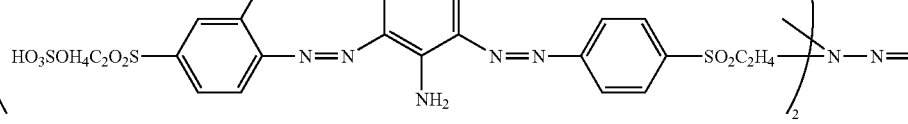
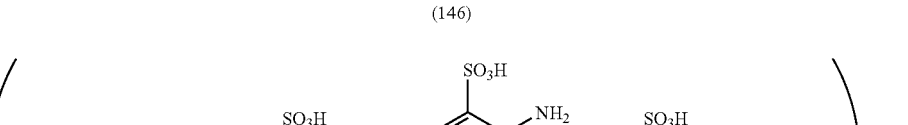
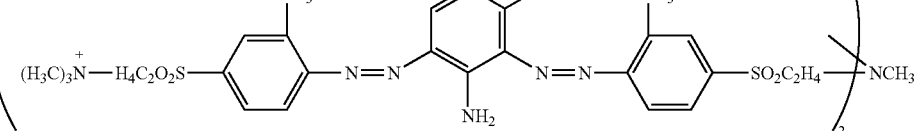
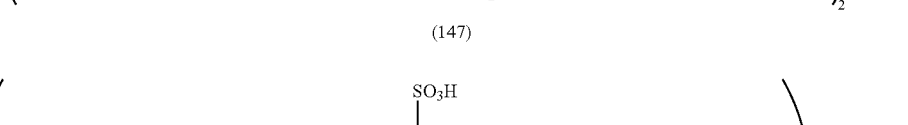

TABLE 2-continued

| Example | Structure | Color Appearance |
|---|---|---|
| 145 | (151) | Orange |
| 146 | (152) | Orange |
| 147 | (153) | Orange |
| 148 | (154) | Orange |
| 149 | (155) | Orange |
| 150 | (156) | Orange |

TABLE 2-continued
| Example | Structure | Color Appearance |
|---|---|---|
| 151 | (157) | Orange |
| 152 | (158) | Orange |
| 153 | (159) | Orange |
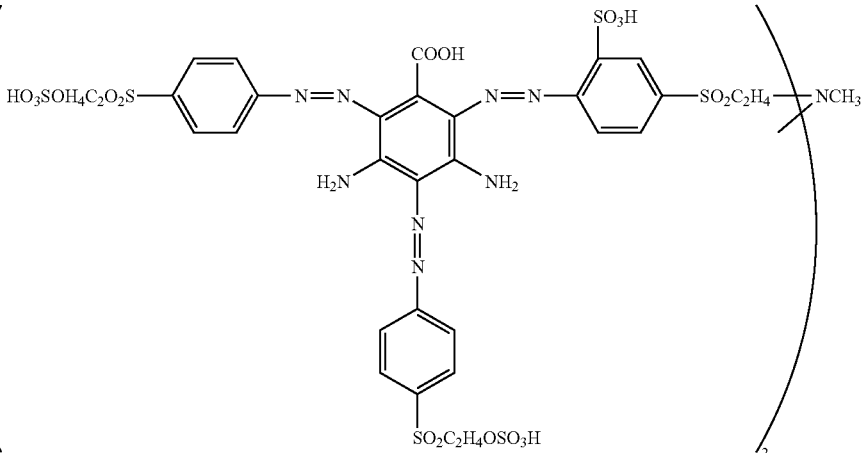
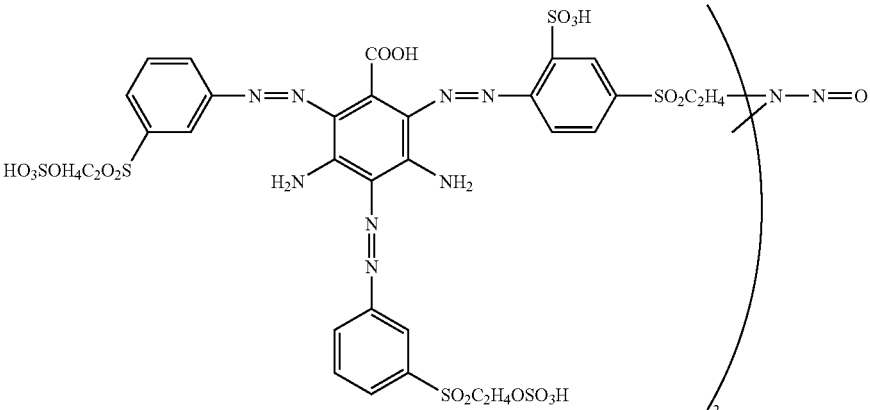
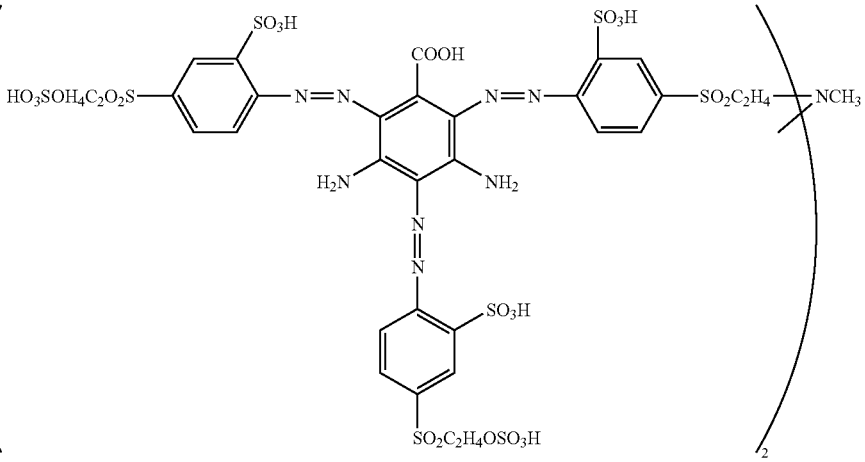

TABLE 2-continued

| Example | Structure | Color Appearance |
|---|---|---|
| 154 | (160) | Orange |
| 155 | (161) | Orange |
| 156 | (162) | Yellow |

TABLE 2-continued
| Example | Structure | Color Appearance |
|---|---|---|
| 157 | 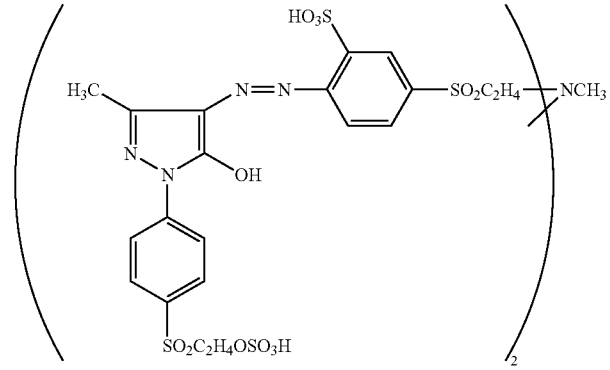 (163) | Yellow |
| 158 | 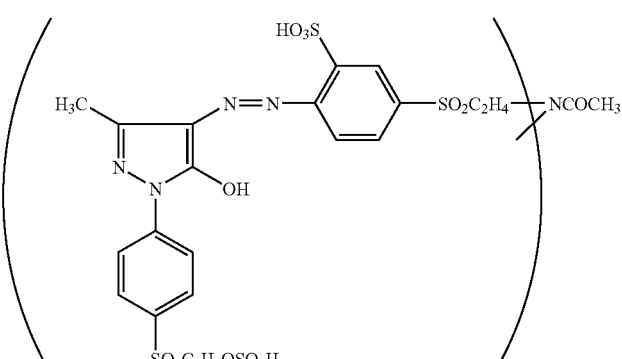 (164) | Yellow |
| 159 | 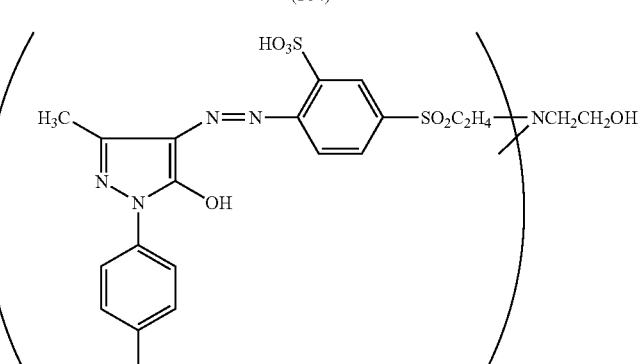 (165) | Yellow |
| 160 | 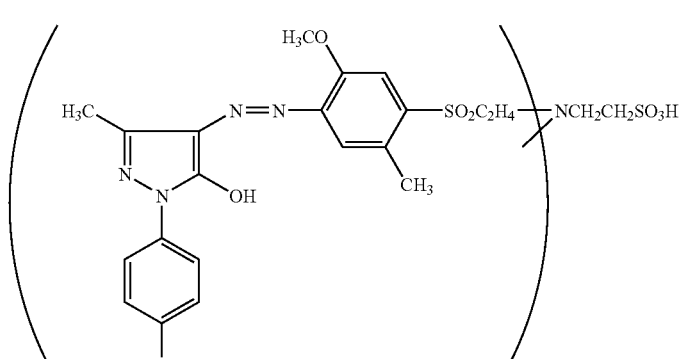 (166) | Yellow |

TABLE 2-continued

| Example | Structure | Color Appearance |
|---|---|---|
| 161 | (167) | Yellow |
| 162 | (168) | Yellow |
| 163 | (169) | Yellow |

TABLE 2-continued
| Example | Structure | Color Appearance |
|---|---|---|
| 164 | 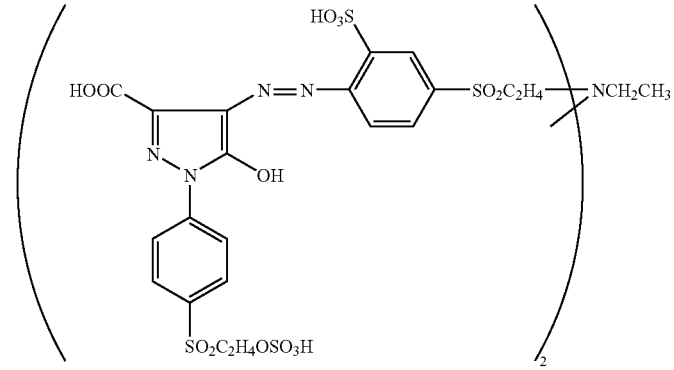 (170) | Yellow |
| 165 | 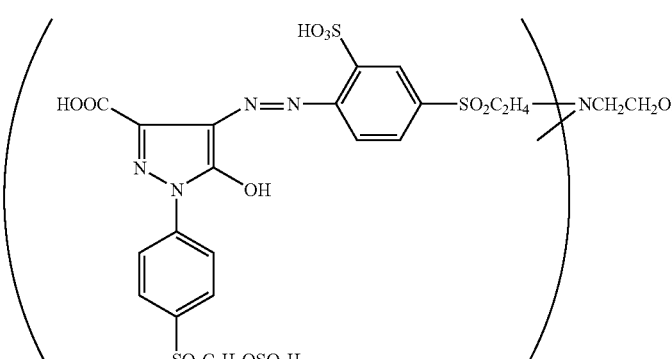 (171) | Yellow |
| 166 | 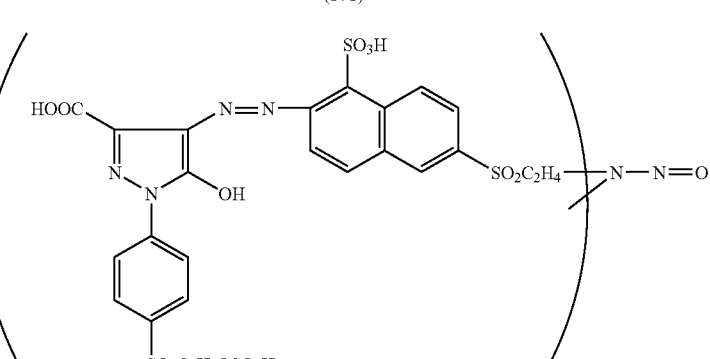 (172) | Yellow |
| 167 | 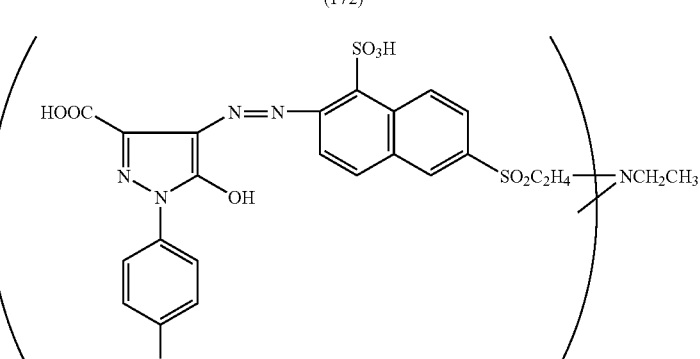 (173) | Yellow |

TABLE 2-continued
| Example | Structure | Color Appearance |
|---|---|---|
| 168 | (174) | Gray |
| 169 | (175) | Gray |
| 170 | (176) | Gray |
| 171 | (177) | Navy |
| 172 | (178) | Navy |
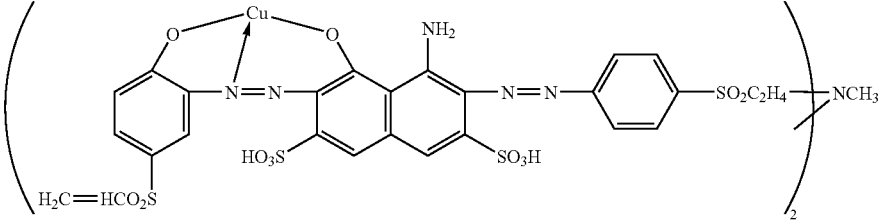
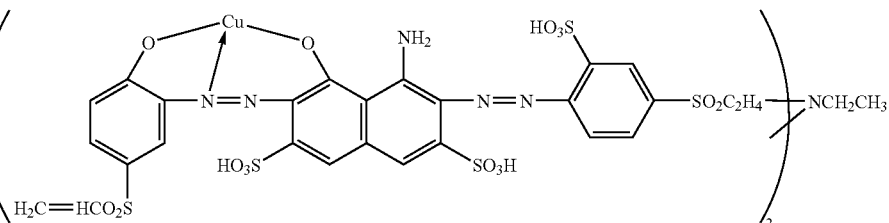
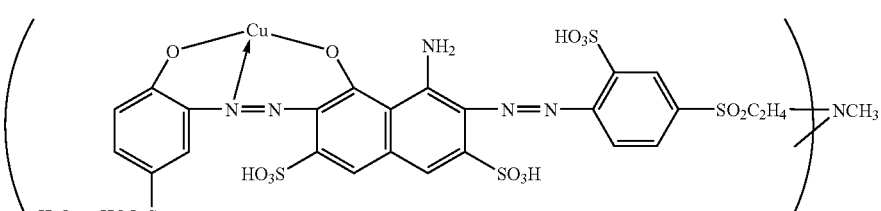
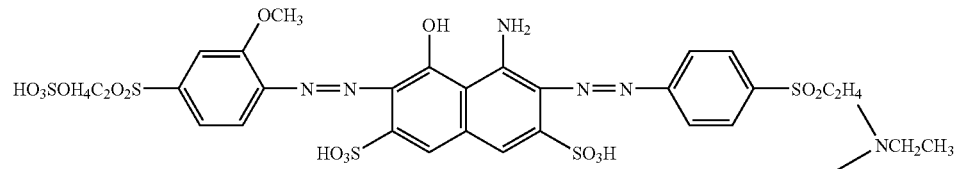
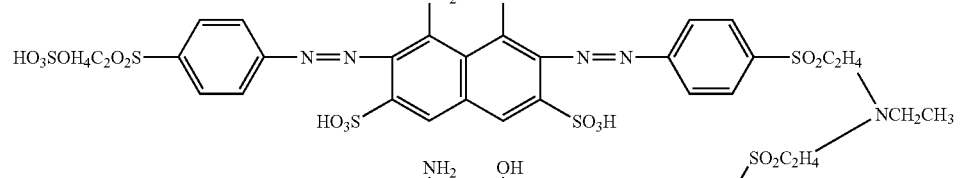

TABLE 2-continued

| Example | Structure | Color Appearance |
|---|---|---|
| 173 | (179) | Navy |
| 174 | (180) | Navy |
| 175 | (181) | Navy |
| 176 | (182) | Navy |

TABLE 2-continued

| Example | Structure | Color Appearance |
|---------|-----------|------------------|
| 177 | (183) | Navy |
| 178 | (184) | Navy |
| 179 | (185) | Red |

TABLE 2-continued
| Example | Structure | Color Appearance |
|---|---|---|
| 180 | (186) | Red |
| 181 | (187) | Red |
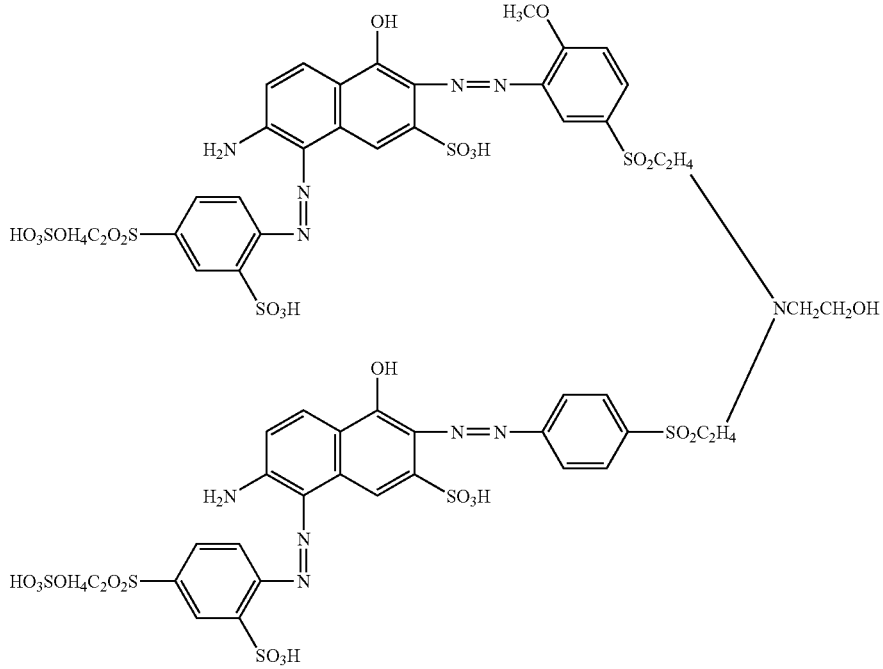
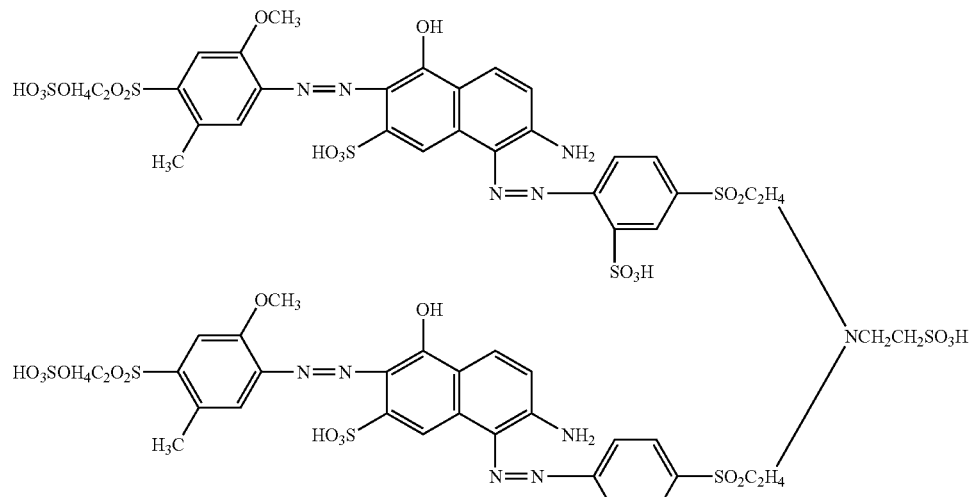

182     Purple
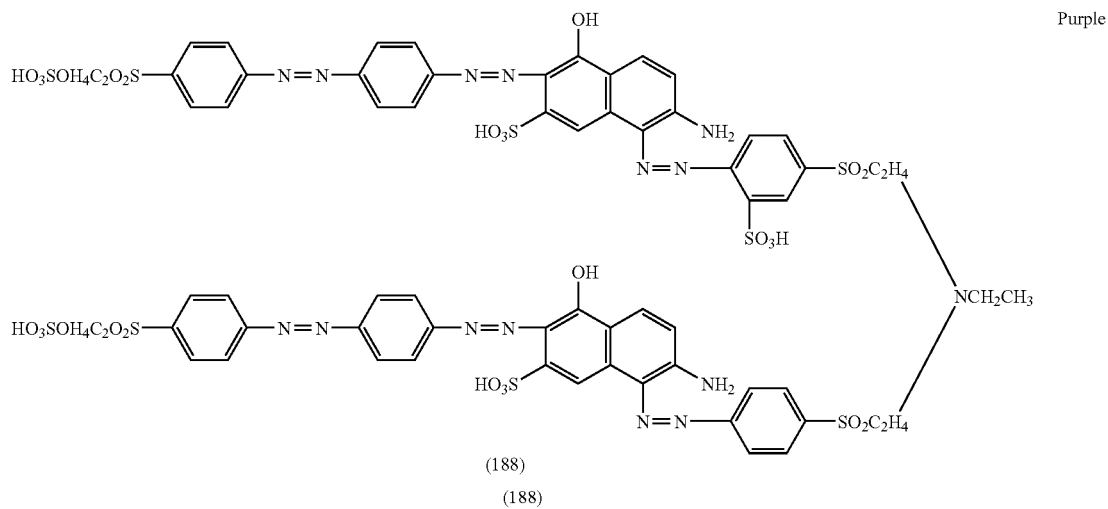
(188)
183     Red
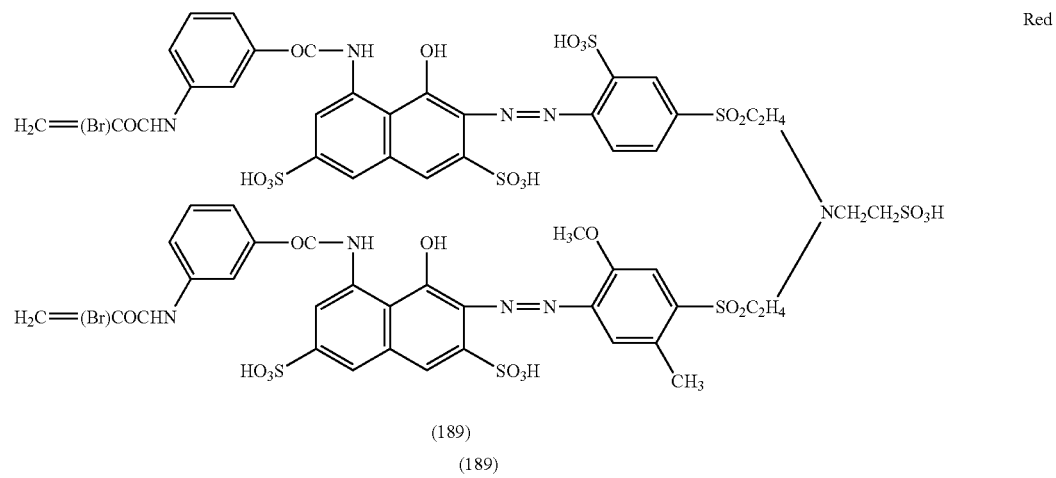
(189)
184     Orange
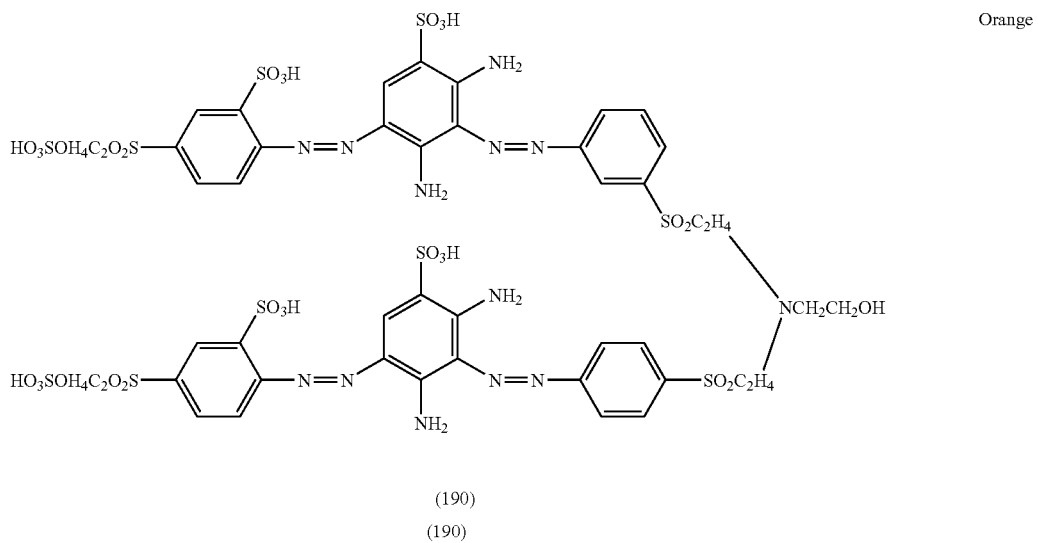
(190)

| 185 | 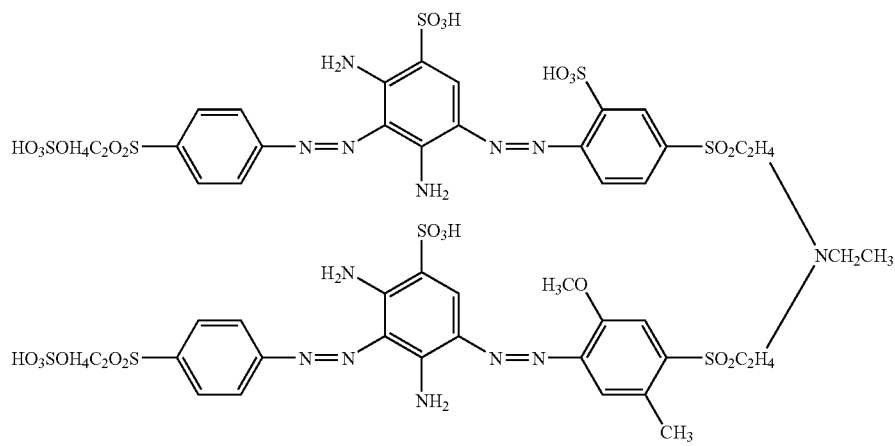 | Orange |
(191)
| 186 | 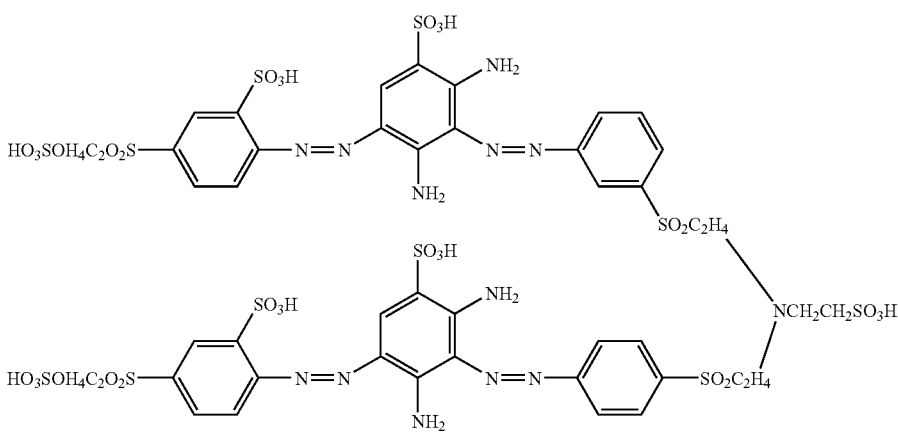 | Orange |
(192)
| 187 | 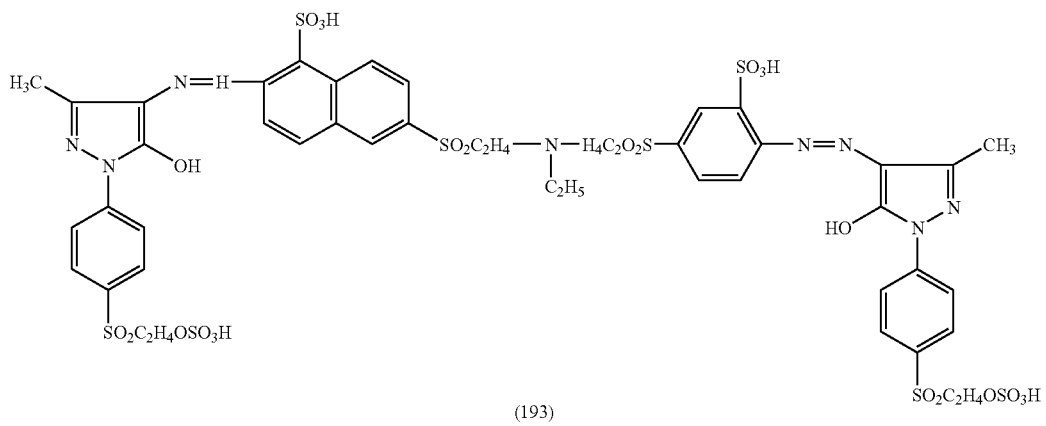 | Yellow |
(193)

188 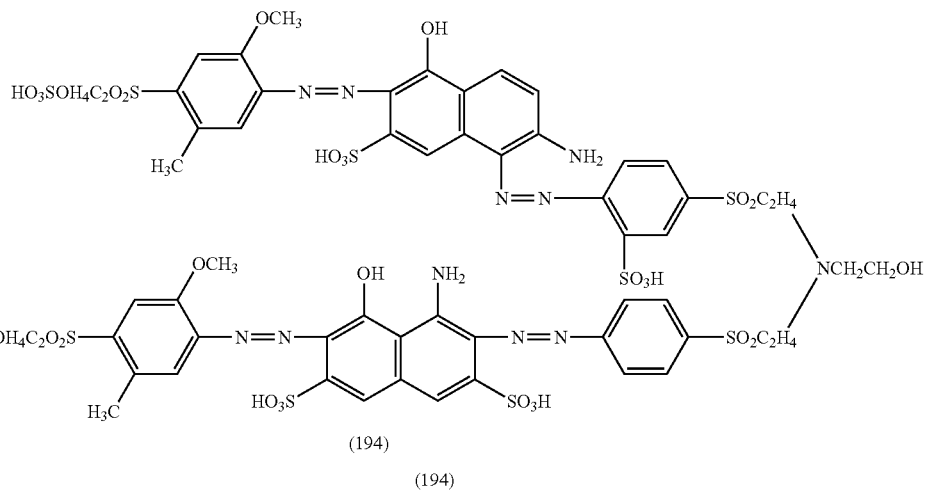 Violet
189 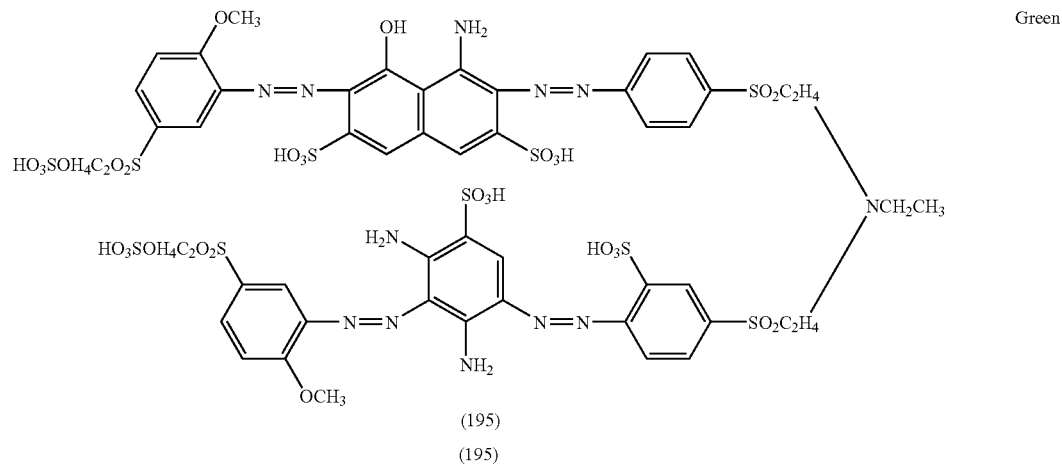 Green
190 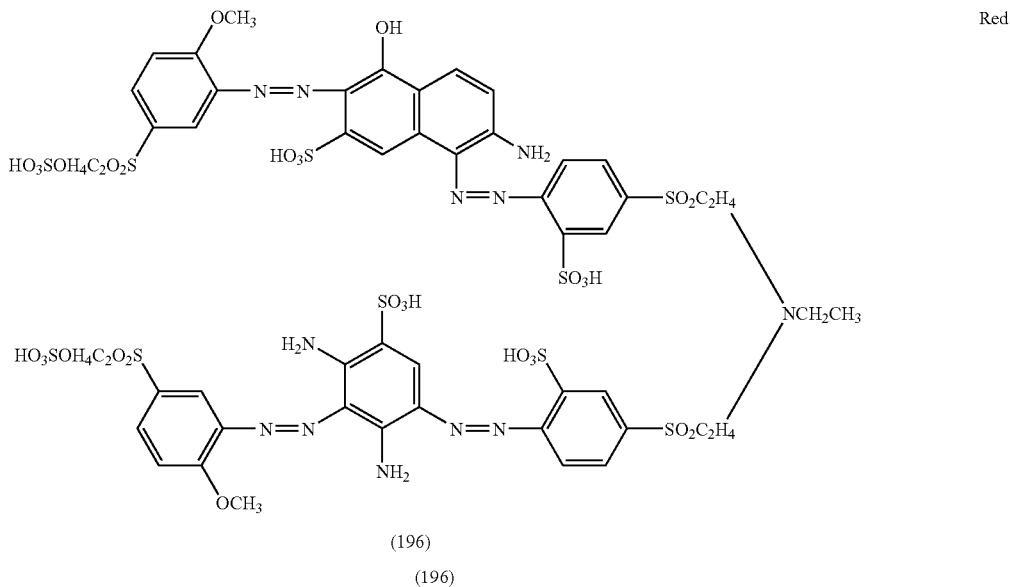 Red

| 191 | 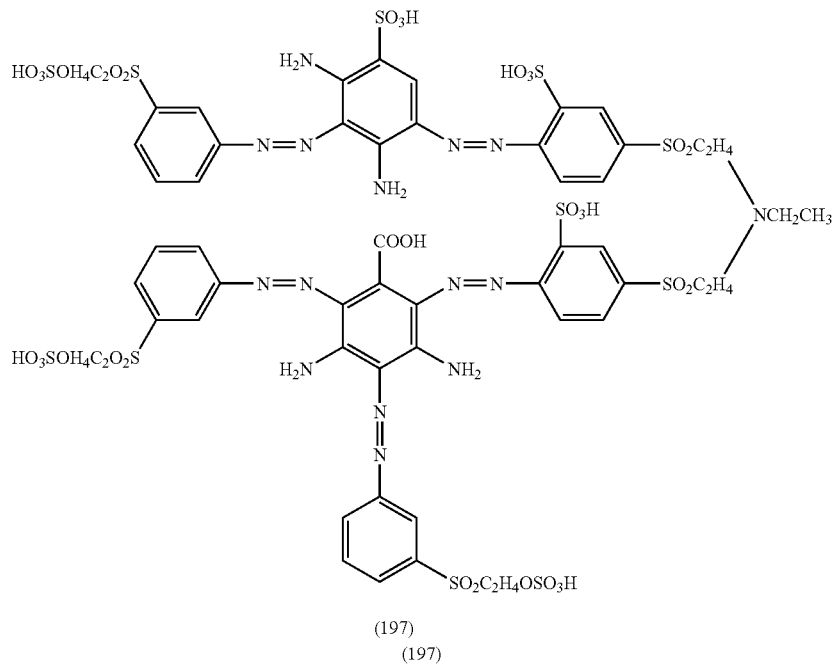 | Orange |
|---|---|---|
| | (197) | |

| 192 | 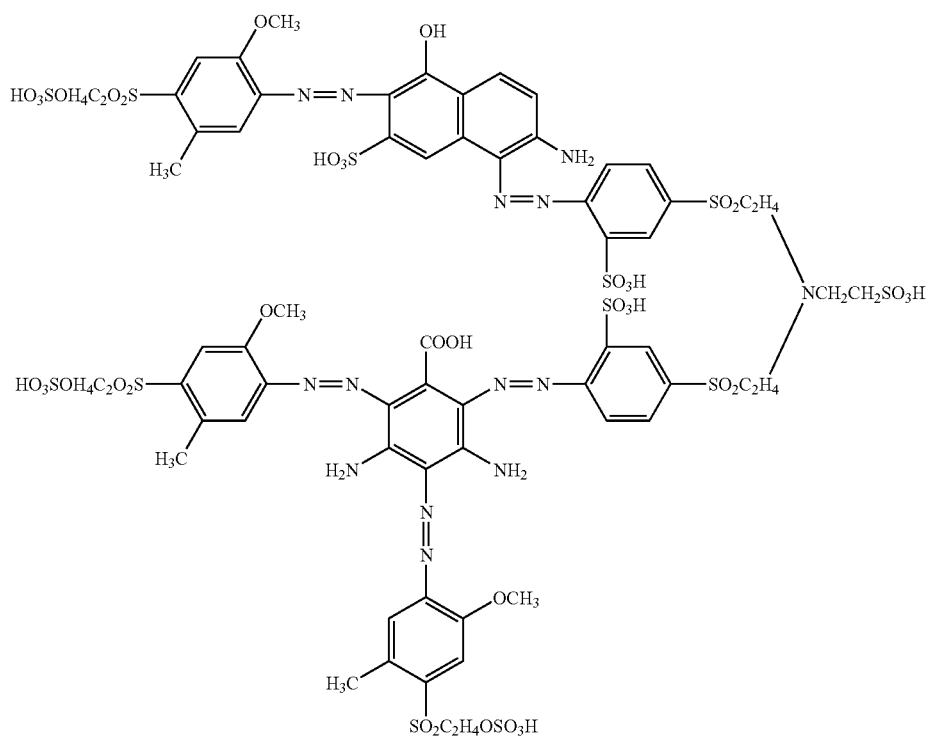 | Red |
|---|---|---|
| | (198) | |

Testing Example 1

3 parts of the dyestuff prepared in Example 59 are dissolved in 100 mL of water to obtain a 30 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained navy blue fabric is orderly washed with cold water, boiling water for 10 minutes, boiling non-ionic detergent for 10 minutes, again with cold water and then dried to obtain a navy blue fabric with good build up and good tinctorial yield.

Testing Example 2

3 parts of the dyestuff prepared in Example 60 are dissolved in 100 mL of water to obtain a 30 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained navy blue fabric is orderly washed with cold water, boiling water for 10 minutes, boiling non-ionic detergent for 10 minutes, again with cold water and then dried to obtain a navy blue fabric with good build up and good tinctorial yield.

Testing Example 3

100 parts of Urea, 10 parts of m-nitrobenzene sulfonic acid sodium salt, 20 parts of sodium bicarbonate, 55 parts of sodium alginate, and 815 parts of lukewarm water (1000 parts in total) are stirred in a vessel to obtain a completely homogeneous printing paste.

3 parts of the dyestuff prepared in Example 62 are sprayed in 100 parts of the above printing paste and stirred to make a homogeneous colored paste. An adequate size piece of twilled cotton fabric is covered with a 100 mesh 45°-twilled printing screen and then painted with the colored paste on the printing screen to give a colored fabric.

This colored fabric is placed in an oven at 65° C. for 5 minutes until dry and then put into a steaming oven using saturated steam of 102~105° C. for 10 minutes.

The obtained red fabric is orderly washed with cold water, boiling water for 10 minutes, boiling non-ionic detergent for 10 minutes, again with cold water and then dried to obtain a red fabric with good build up and good tinctorial yield.

From the foregoing description, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A reactive dyestuff with an N,N-dialkylamino bridge group of the following formula (I),

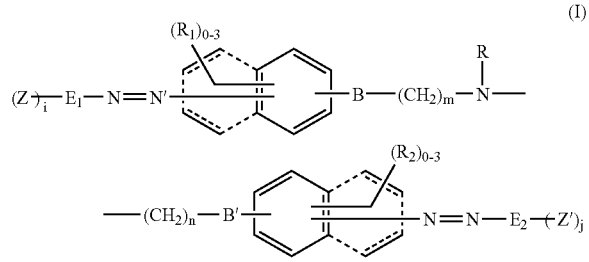

wherein, $E_1$ and $E_2$ each independently are couplers selected from the group consisting of benzene, naphthalene, pyrazolone, monoazo, disazo, polyazo and metal complex azo components;

R is hydrogen, $C_{1-4}$ alkyl, $C_{1-4}$ alkylcarbonyl, phenyl, nitroso or $C_{1-4}$ alkyl substituted by halogen, hydroxyl, carboxyl or sulfo;

$(R_1)_{0-3}$ and $(R_2)_{0-3}$ each independently are 0 to 3 identical or different groups, and each of $R_1$ and $R_2$ independently is selected from the group consisting of hydrogen, halogen, hydroxyl, carboxyl, sulfo, nitro, cyano, $C_{1-4}$ alkyl, $C_{1-4}$ alkoxy, ureido and amido;

B and B' each independently are selected from the group consisting of a direct bond, —$SO_2$— and —CONH— $(CH_2)_k$—$SO_2$—;

k is an integer between 1 to 6;

Z and Z' each independently are selected from the group consisting of —$SO_2$—U, —CONH—$(CH_2)_d$—$SO_2$—U, —O—$(CH_2)_r$—CONH—$(CH_2)_d$—$SO_2$—U, β-thiosulfatoethylsulfonyl and —N(R')—U';

d and r are integers independent of one another between 2 to 4;

U is —$CH_2CH_2W$ or —CH=$CH_2$;

W is a leaving group, selected from the group consisting of —Cl, —$SO_3H$ and —$OPO_3H$, which is eliminable by a base, a quaternary salt selected from the group consisting of quaternary ammonium, pyridine, carboxypyridinium, methylpyridinium carbonamidopyridinium, and a group of the formula

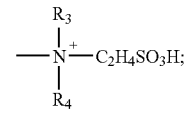

$R_3$ and $R_4$ each independently are hydrogen or $C_{1-4}$ alkyl;

U' is α,β-halopropionyl, α-haloacryloyl, β-halopropionyl or α-haloacryloyl;

R' is hydrogen or $C_{1-4}$ alkyl;

i and j are integers independent of one another between 0 to 2, and the sum of i and j is not 0;

m and n are integers independent of one another between 2 to 4; and the ring containing the dashed lines represents an optional fused benzene ring.

2. The reactive dyestuff with an N,N-dialkylamino bridge group as claimed in claim 1, wherein R is hydrogen, $C_{1-4}$ alkyl, $C_{1-4}$ alkylcarbonyl, phenyl, nitroso or $C_{1-4}$ alkyl substituted by hydroxyl or sulfo.

3. The reactive dyestuff with an N,N-dialkylamino bridge group as claimed in claim 1, wherein $(R_1)_{0-3}$ and $(R_2)_{0-3}$ each independently are 0 to 3 identical or different groups, and each of $R_1$ and $R_2$ independently is selected from the group consisting of hydrogen, sulfo, $C_{1-4}$ alkyl and $C_{1-4}$ alkoxy.

4. The reactive dyestuff with an N,N-dialkylamino bridge group as claimed in claim 1, wherein B and B' each independently are —$SO_2$— or —CONH—$(CH_2)_k$—$SO_2$—.

5. The reactive dyestuff with an N,N-dialkylamino bridge group as claimed in claim 1, wherein Z and Z' each independently are selected from the group consisting of —$SO_2$—U, —CONH—$(CH_2)_d$—$SO_2$—U and —N(R')—U'.

6. The reactive dyestuff with an N,N-dialkylamino bridge group as claimed in claim 1, wherein $E_1$ and $E_2$ each independently are a pyrazolone component of the following formula,

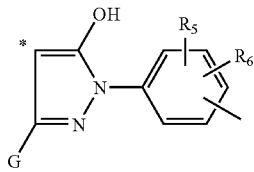

wherein, G is $C_{1-3}$ alkyl, carboxyl or $C_{2-5}$ alkylcarboxyl; and $R_5$ and $R_6$ each independently are selected from the group consisting of hydrogen, halogen, hydroxyl, carboxyl, sulfo, nitro, cyano, $C_{1-4}$ alkyl and $C_{1-4}$ alkoxy.

7. The reactive dyestuff with an N,N-dialkylamino bridge group as claimed in claim 1, wherein $E_1$ and $E_2$ each independently are a benzene component of the following formula,

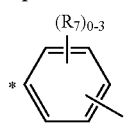

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

8. The reactive dyestuff with an N,N-dialkylamino bridge group as claimed in claim 1, wherein $E_1$ and $E_2$ each independently are a naphthalene component selected from the group consisting of

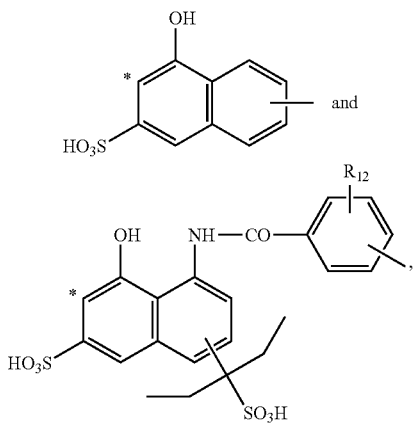

wherein, $R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy.

9. The reactive dyestuff with an N,N-dialkylamino bridge group as claimed in claim 1, wherein $E_1$ and $E_2$ each independently are a monoazo component selected from the group consisting of

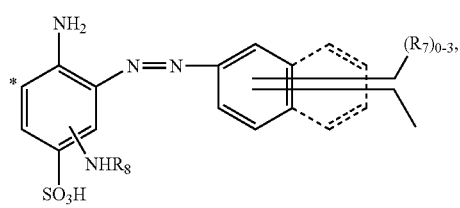

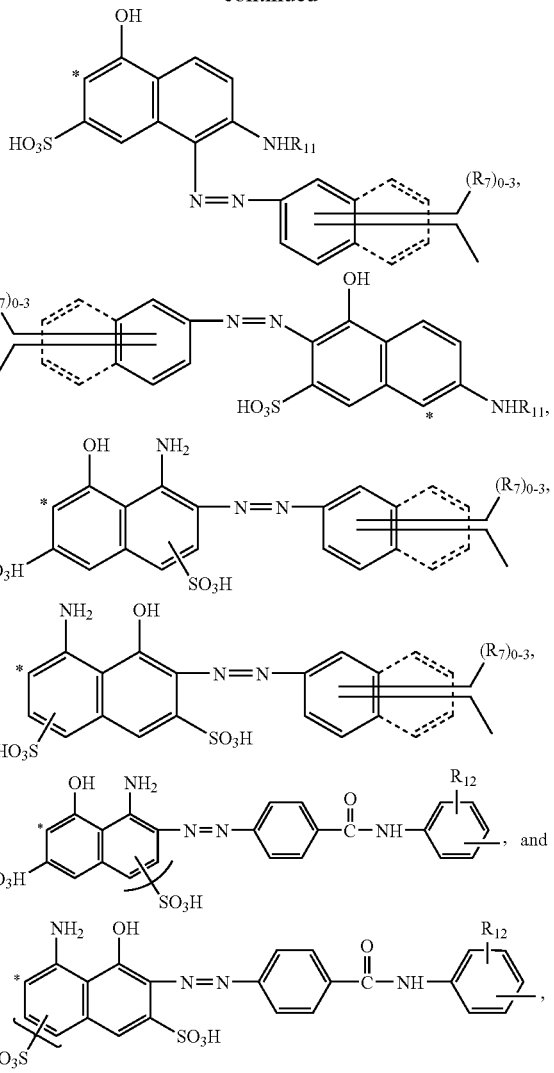

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_8$ is hydrogen, $C_{1-4}$ alkyl, $C_{2-4}$ alkylcarboxyl or $C_{1-4}$ alkyl substituted by hydroxyl, cyano, carboxyl, sulfo, methoxycarbonyl, ethoxycarbonyl or acetoxy;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

$R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy; and the ring containing the dashed lines represents an optional fused benzene ring.

10. The reactive dyestuff with an N,N-dialkylamino bridge group as claimed in claim 1, wherein $E_1$ and $E_2$ each independently are a disazo component selected from the group consisting of

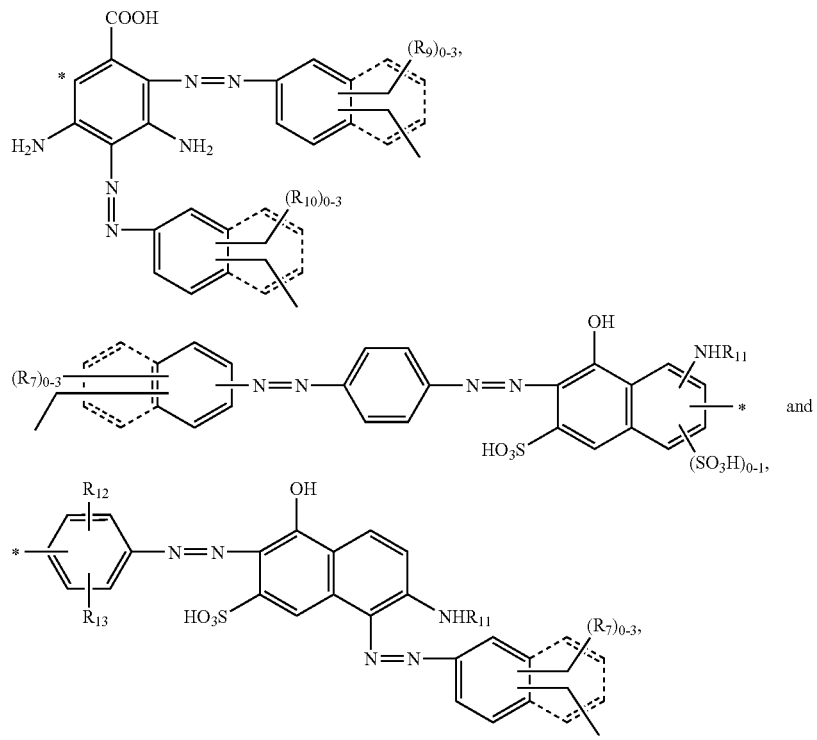

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_9)_{0-3}$ is 0 to 3 identical or different groups, and each of $R_9$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$(R_{10})_{0-3}$ is 0 to 3 identical or different groups, and each of $R_{10}$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

$R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy;

$R_{13}$ is selected from the group consisting of hydrogen, halogen, hydroxyl, carboxyl, sulfo, amino, nitro, cyano, acetylamino, uredio, $C_{1-4}$ alkyl and $C_{1-4}$ alkoxy; and the ring containing the dashed lines represents an optional fused benzene ring.

11. The reactive dyestuff with an N,N-dialkylamino bridge group as claimed in claim 1, wherein $E_1$ and $E_2$ each independently are a polyazo component of the following formula,

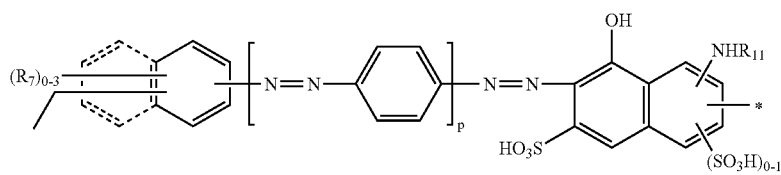

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

p is 2 or 3; and the ring containing the dashed lines represents an optional fused benzene ring.

12. The reactive dyestuff with an N,N-dialkylamino bridge group as claimed in claim 1, wherein $E_1$ and $E_2$ each independently are a polyazo component selected from the group consisting of

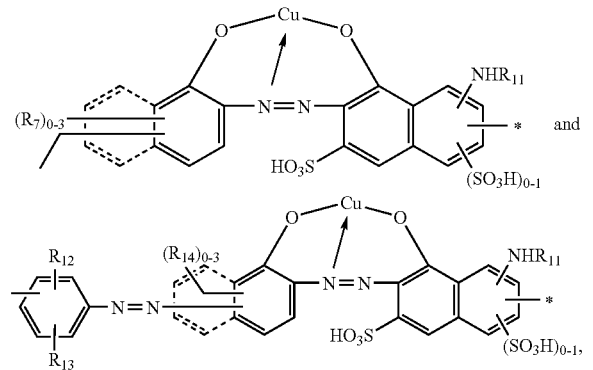

wherein, $(R_7)_{0-3}$ is 0 to 3 identical or different groups, and each of $R_7$ independently is selected from the group consisting of halogen, hydroxyl, carboxyl, sulfo, amino, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl;

$R_{11}$ is hydrogen, $C_{1-4}$ alkyl, unsubstituted or substituted phenyl by halogen, hydroxyl, carboxyl, sulfo, nitro, $C_{1-4}$ alkyl or $C_{1-4}$ alkoxy, or $C_{1-4}$ alkyl substituted by hydroxyl, carboxyl, cyano or sulfo;

$R_{12}$ is selected from the group consisting of hydrogen, halogen, hydroxyl, carboxyl, sulfo, amino, nitro, cyano, acetylamino, ureido, $C_{1-4}$ alkyl and $C_{1-4}$ alkoxy;

$R_{13}$ is selected from the group consisting of hydrogen, halogen, hydroxyl, carboxyl, sulfo, amino, nitro, cyano, acetylamino, uredio, $C_{1-4}$ alkyl and $C_{1-4}$ alkoxy; and $(R_{14})_{0-3}$ is 0 to 3 identical or different groups, and each of $R_{14}$ independently is selected from the group consisting of halogen, hydroxyl, carboxyl, sulfo, nitro, cyano, $C_{1-4}$ alkyl, $C_{1-4}$ alkoxy, $C_{2-6}$ alkoxycarbonyl, carbamoyl, $C_{2-5}$ alkanoylamino and $C_{2-5}$ alkylcarboxyl.

13. The reactive dyestuff with an N,N-dialkylamino bridge group as claimed in claim 1, wherein $E_1$ and $E_2$ each independently are a pyrazolone component of the following formula,

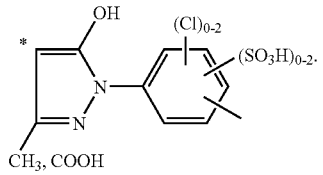

14. The reactive dyestuff with an N,N-dialkylamino bridge group as claimed in claim 1, wherein $E_1$ and $E_2$ each independently are a naphthalene component of the following formula,

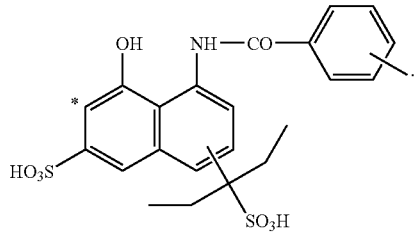

15. The reactive dyestuff with an N,N-dialkylamino bridge group as claimed in claim 1, wherein $E_1$ and $E_2$ each independently are a monoazo component selected from the group consisting of

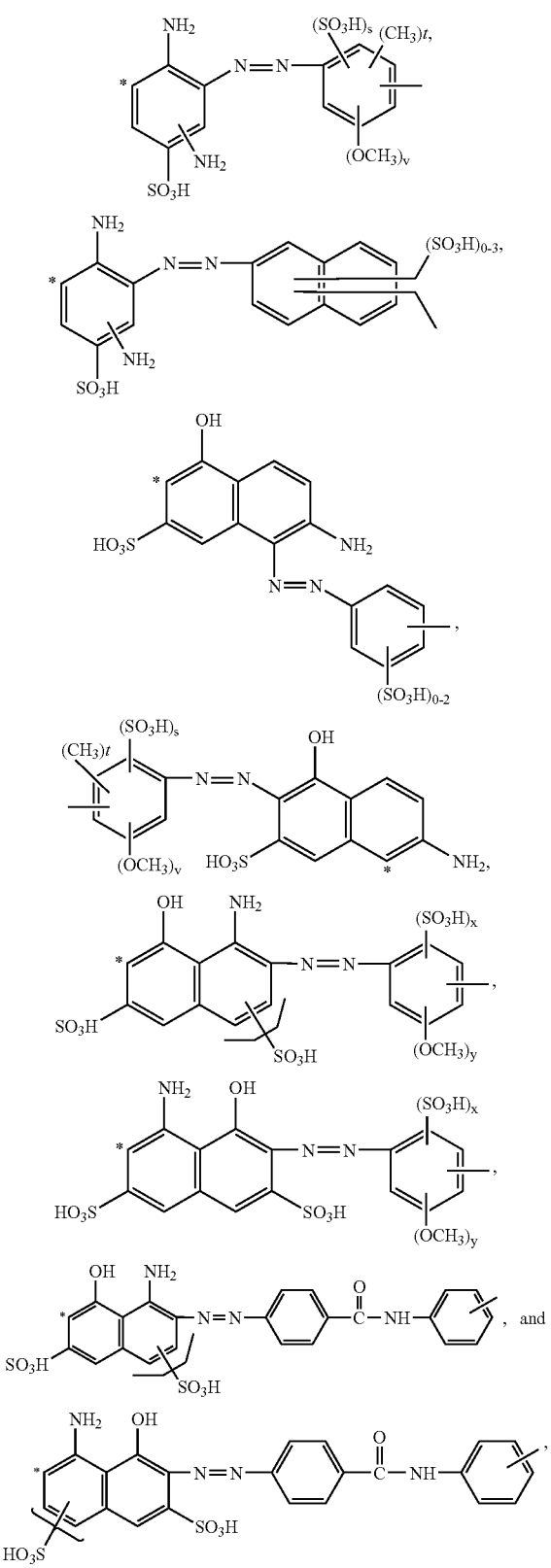

wherein, s, t and v are integers independent of one another between 0 to 2, and s+t+v is an integer between 0 to 3; and x and y are integers independent of one another between 0 to 2, and x+y is an integer between 0 to 3.

16. The reactive dyestuff with an N,N-dialkylamino bridge group as claimed in claim 1, wherein $E_1$ and $E_2$ each independently are a disazo component selected from the group consisting of

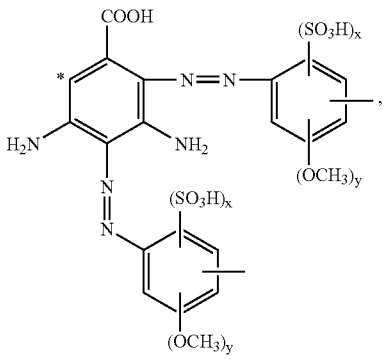

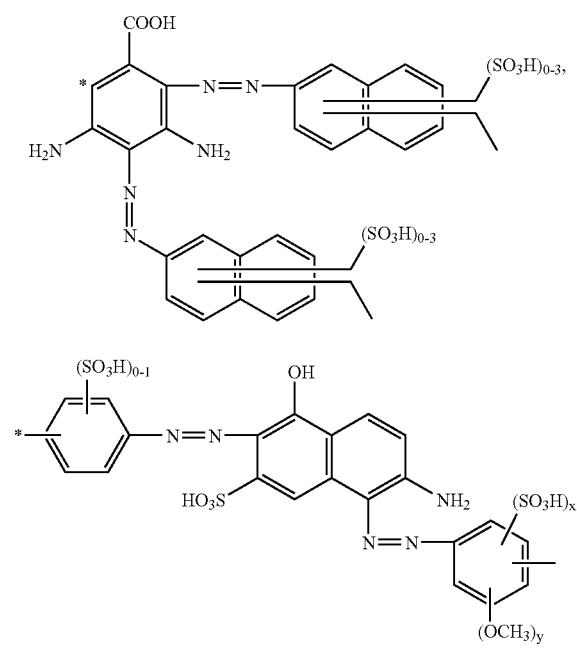

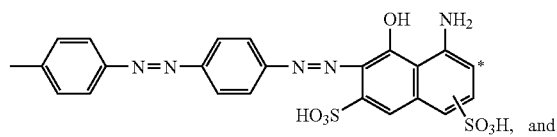

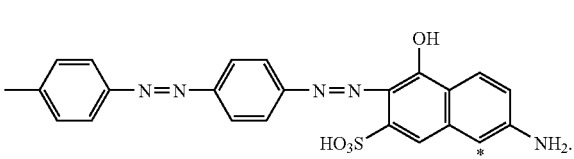

and wherein x and y are integers independent of one another between 0 to 2, and x+y is an integer between 0 to 3.

17. The reactive dyestuff with an N,N-dialkylamino bridge group as claimed in claim 1, wherein $E_1$ and $E_2$ each independently are a metal complex azo component of the following formula,

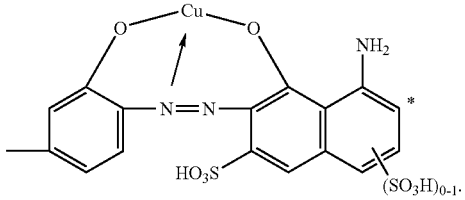

18. The reactive dyestuff with an N,N-dialkylamino bridge group as claimed in claim 1, wherein the reactive dyestuff of the formula (I) is a compound of the following formula (61),

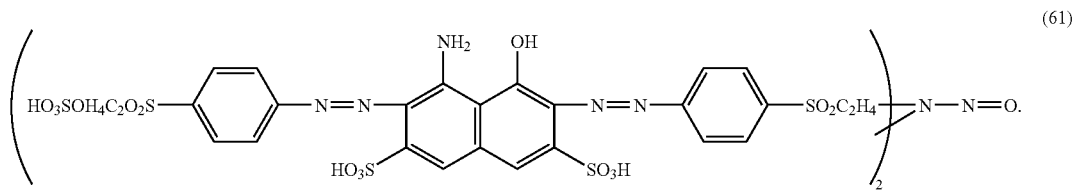

19. The reactive dyestuff with an N,N-dialkylamino bridge group as claimed in claim 1, wherein the reactive dyestuff of the formula (I) is a compound of the following formula (66),

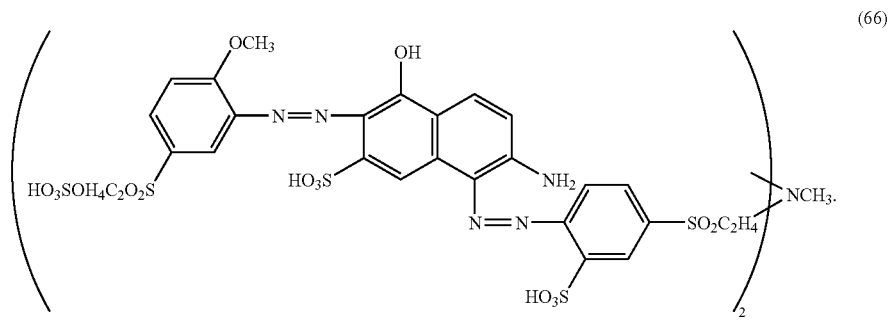
(66)
20. The reactive dyestuff with an N,N-dialkylamino bridge group as claimed in claim 1, wherein the reactive dyestuff of the formula (I) is a compound of the following formula (67),
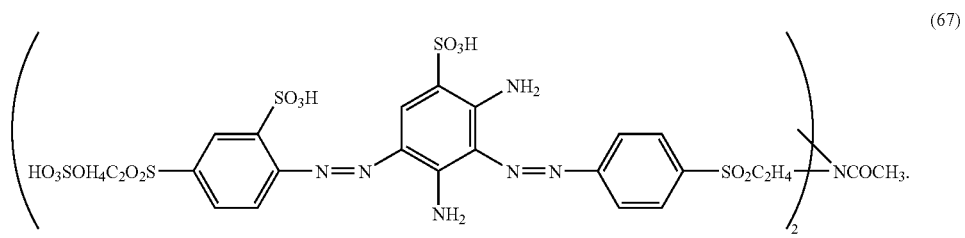
(67)
21. A dyestuff with an N,N-dialkylamino bridge group of the following formula (70),
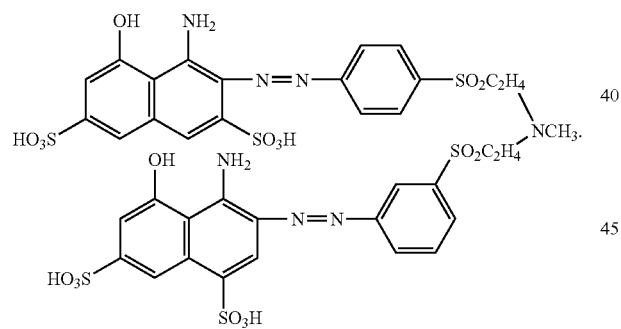
(70)
* * * * *